US009073351B2

(12) United States Patent
Kubota et al.

(10) Patent No.: US 9,073,351 B2
(45) Date of Patent: Jul. 7, 2015

(54) MEDIUM PROCESSING APPARATUS

(71) Applicant: NIDEC SANKYO CORPORATION, Nagano (JP)

(72) Inventors: Kohei Kubota, Nagano (JP); Shigeki Oguchi, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/358,548

(22) PCT Filed: Nov. 29, 2012

(86) PCT No.: PCT/JP2012/080811
§ 371 (c)(1),
(2) Date: May 15, 2014

(87) PCT Pub. No.: WO2013/088958
PCT Pub. Date: Jun. 20, 2013

(65) Prior Publication Data
US 2014/0285610 A1      Sep. 25, 2014

(30) Foreign Application Priority Data

Dec. 15, 2011   (JP) ................................. 2011-274240

(51) Int. Cl.
*B41J 11/00*         (2006.01)
*B41J 13/00*         (2006.01)
*B41J 2/32*          (2006.01)
(Continued)

(52) U.S. Cl.
CPC .. *B41J 13/00* (2013.01); *B41J 2/32* (2013.01); *B41J 2202/31* (2013.01); *B41J 25/34* (2013.01); *G06K 1/121* (2013.01); *B41J 13/12* (2013.01); *B41J 29/023* (2013.01)

(58) Field of Classification Search
USPC ........... 347/16, 171, 197–198, 211, 213–215, 347/217–219, 222; 400/611, 613, 618, 621, 400/621.1
See application file for complete search history.

(56) References Cited

U.S. PATENT DOCUMENTS

| 5,157,415 | A | * | 10/1992 | Seyasu ......................... 347/197 |
| 5,678,938 | A | * | 10/1997 | Saito et al. .................... 347/198 |
| 6,532,032 | B2 | * | 3/2003 | Dunham et al. .............. 347/171 |
| 6,760,052 | B2 | * | 7/2004 | Cummins et al. ............. 347/171 |
| 2006/0082636 | A1 | * | 4/2006 | Maruyama .................... 347/197 |

FOREIGN PATENT DOCUMENTS

JP      2-112954 A     4/1990
JP      5-12152 U      2/1993
(Continued)

OTHER PUBLICATIONS

International Search Report for International Application No. PCT/JP2012/080811; Date of Mailing, Feb. 12, 2013, with English translation.

(Continued)

*Primary Examiner* — Kristal Feggins
(74) *Attorney, Agent, or Firm* — Cantor Colburn LLP

(57) ABSTRACT

A medium processing apparatus may include a medium conveying passage; a thermal head; a head holding part; and a moving mechanism structured to move the thermal head and the head holding part between a contact position and a retreated position. The head holding part may include a head holding member; a head support shaft structured to support the thermal head; and a pressing mechanism structured to press the thermal head toward the head holding member in the conveyance direction of the medium.

15 Claims, 18 Drawing Sheets

(51) Int. Cl.
*B41J 25/34* (2006.01)
*G06K 1/12* (2006.01)
*B41J 13/12* (2006.01)
*B41J 29/02* (2006.01)

(56) References Cited

FOREIGN PATENT DOCUMENTS

| JP | 5-13750 U | 2/1993 |
| JP | 06-143737 A | 5/1994 |
| JP | 06-064884 U | 9/1994 |
| JP | 07-195796 A | 8/1995 |
| JP | 9-290546 A | 11/1997 |
| JP | 10-119327 A | 5/1998 |
| JP | 2010-234695 A | 10/2010 |

OTHER PUBLICATIONS

Written Opinion and Explanation by International Searching Authority for WO 2013-088958; PCT/JP2012/080811; Date of Mailing, Jan. 31, 2013, with English translation.

* cited by examiner

Fig. 3
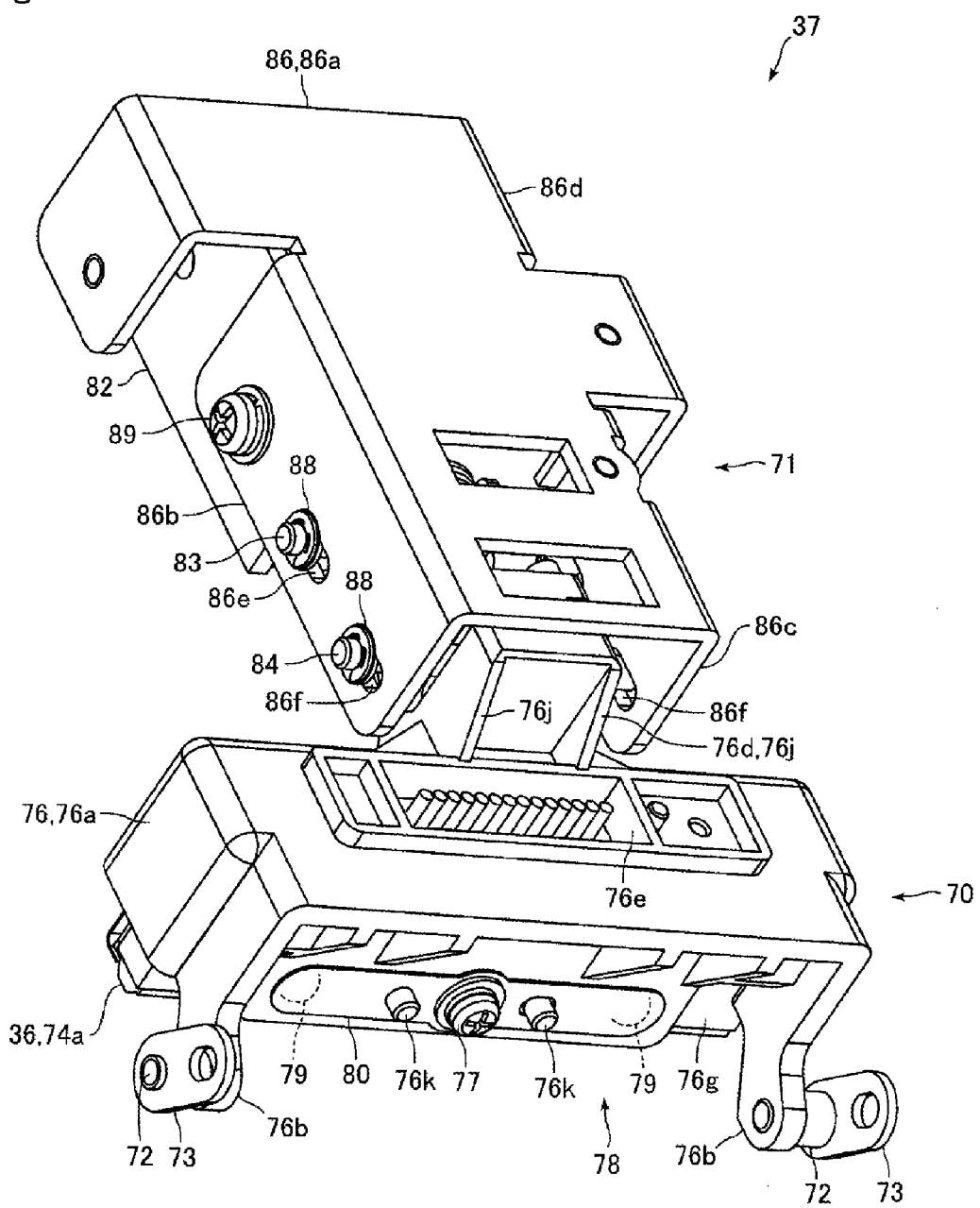
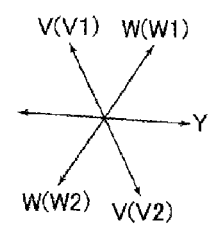

Fig. 7
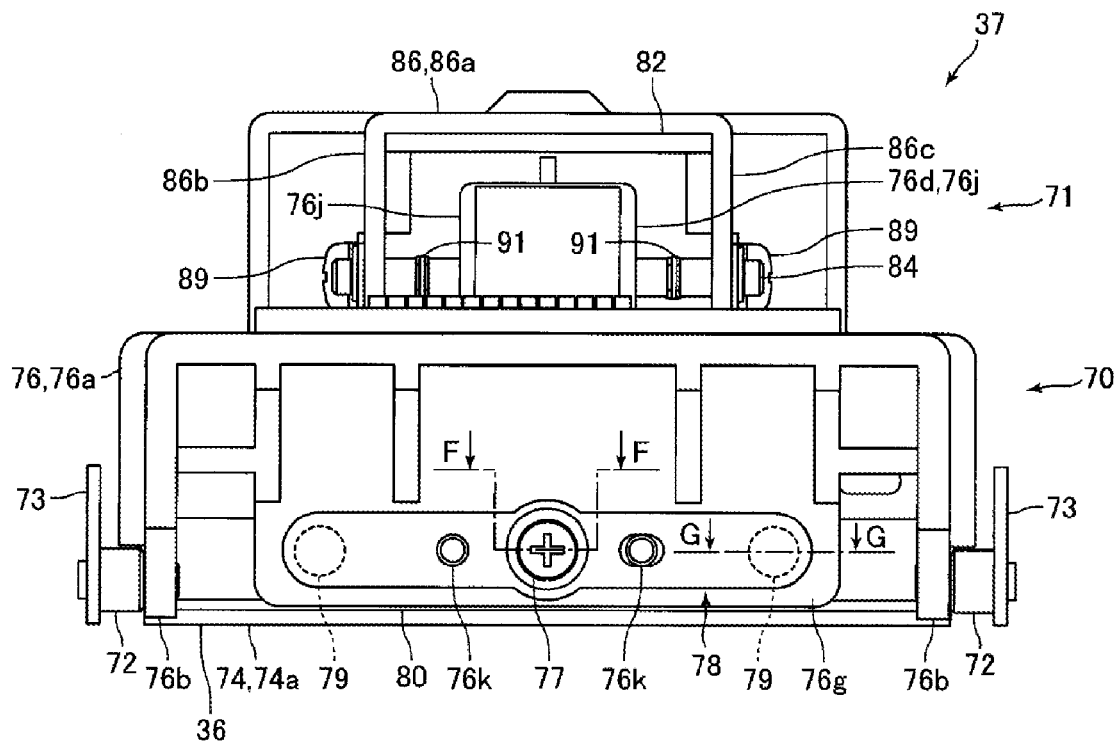
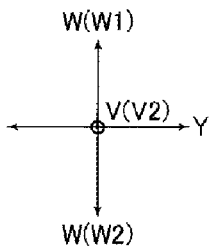
Fig. 8
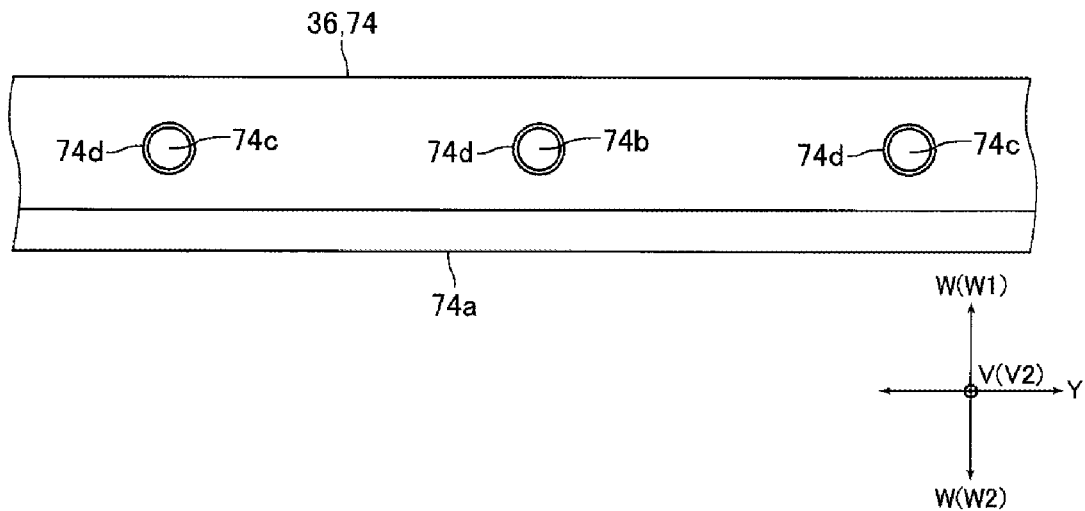

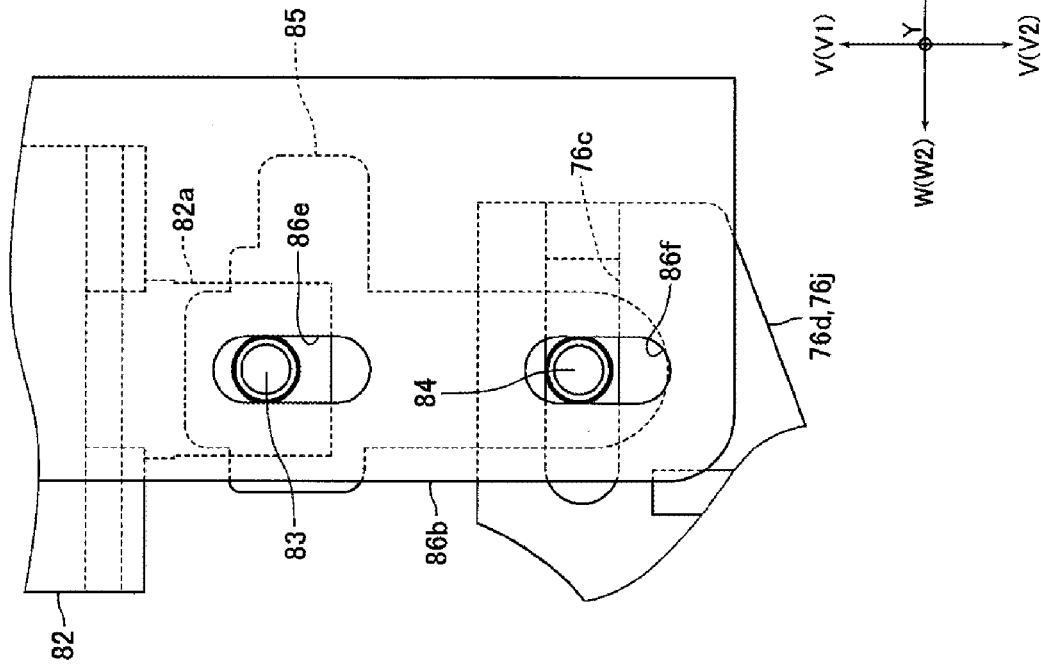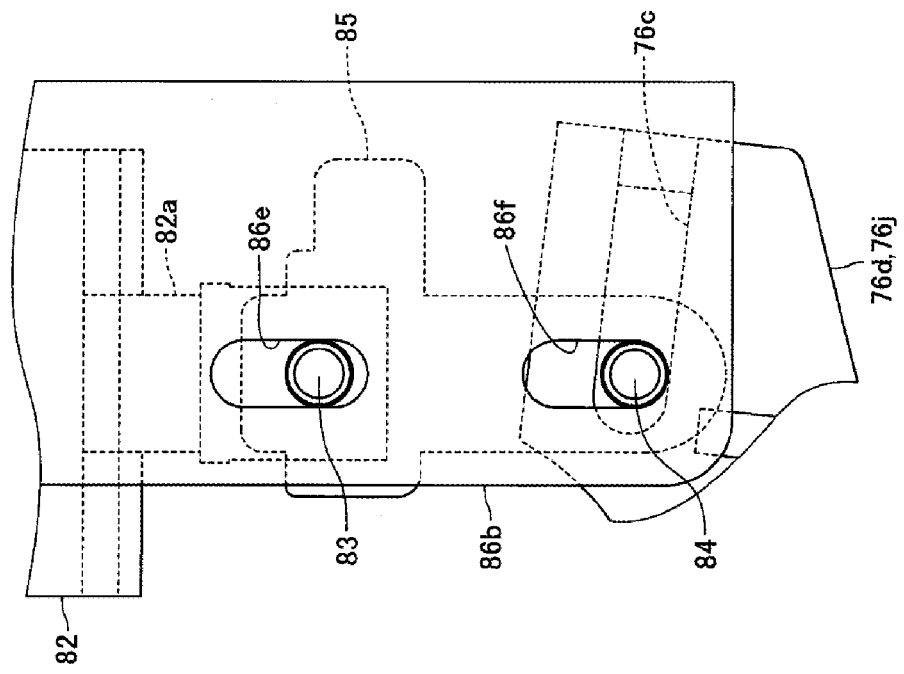

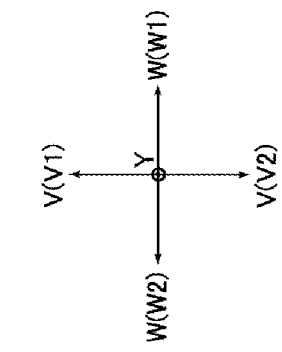
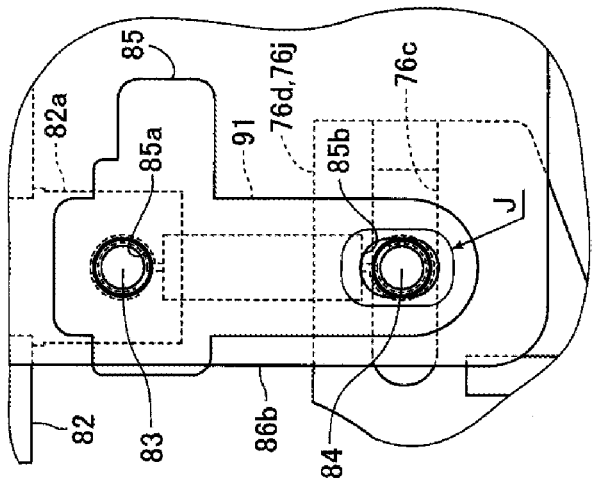
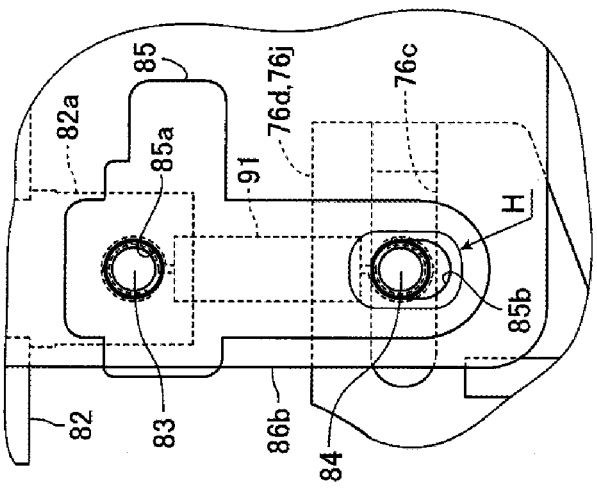
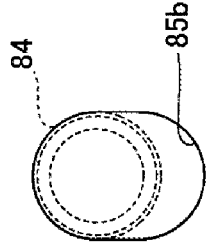
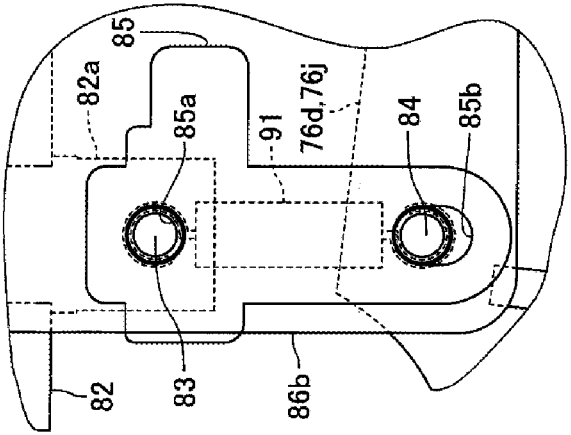

Fig. 14
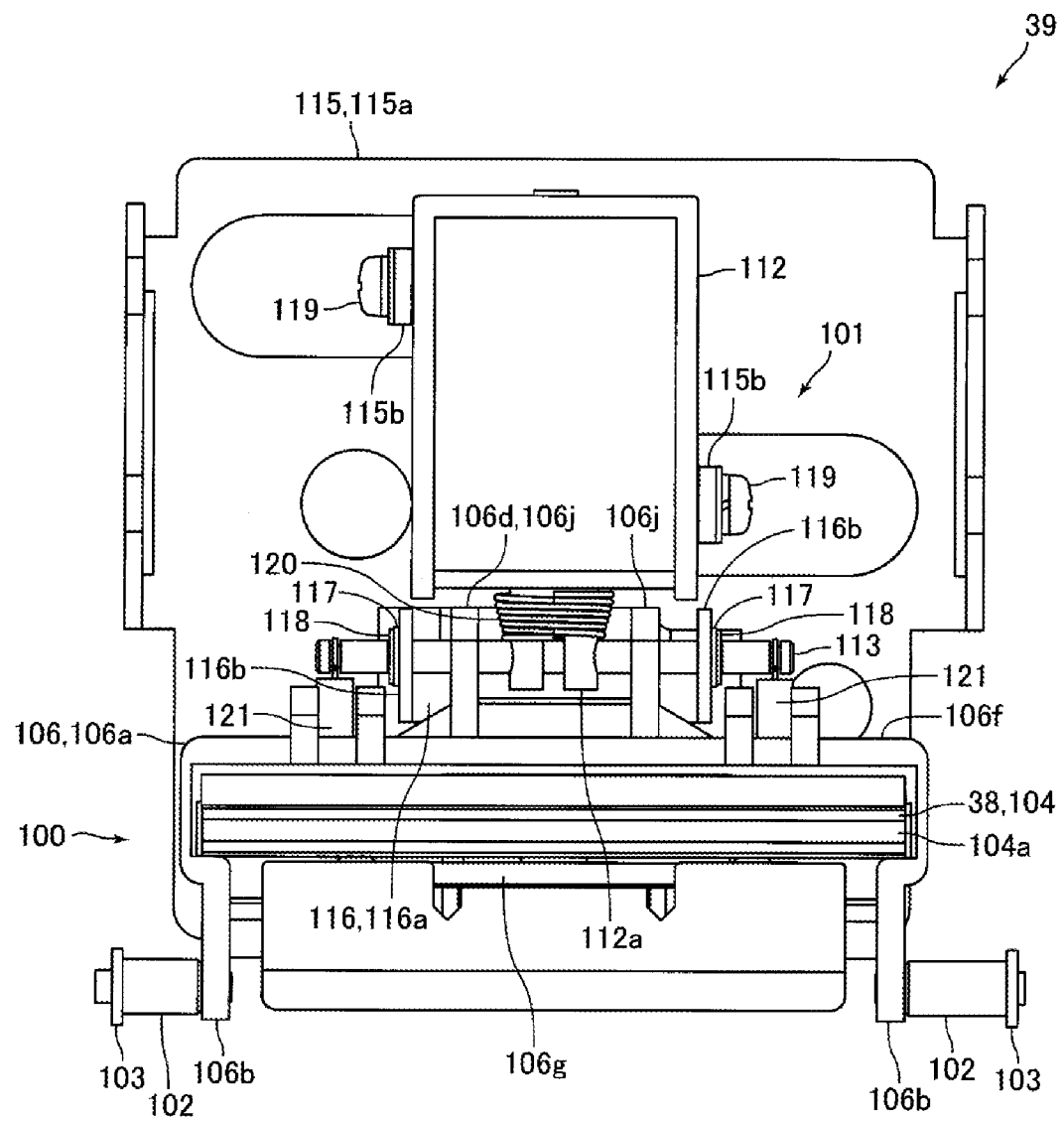
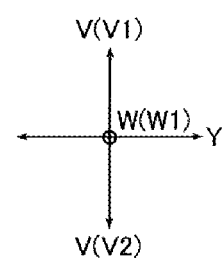

Fig. 17
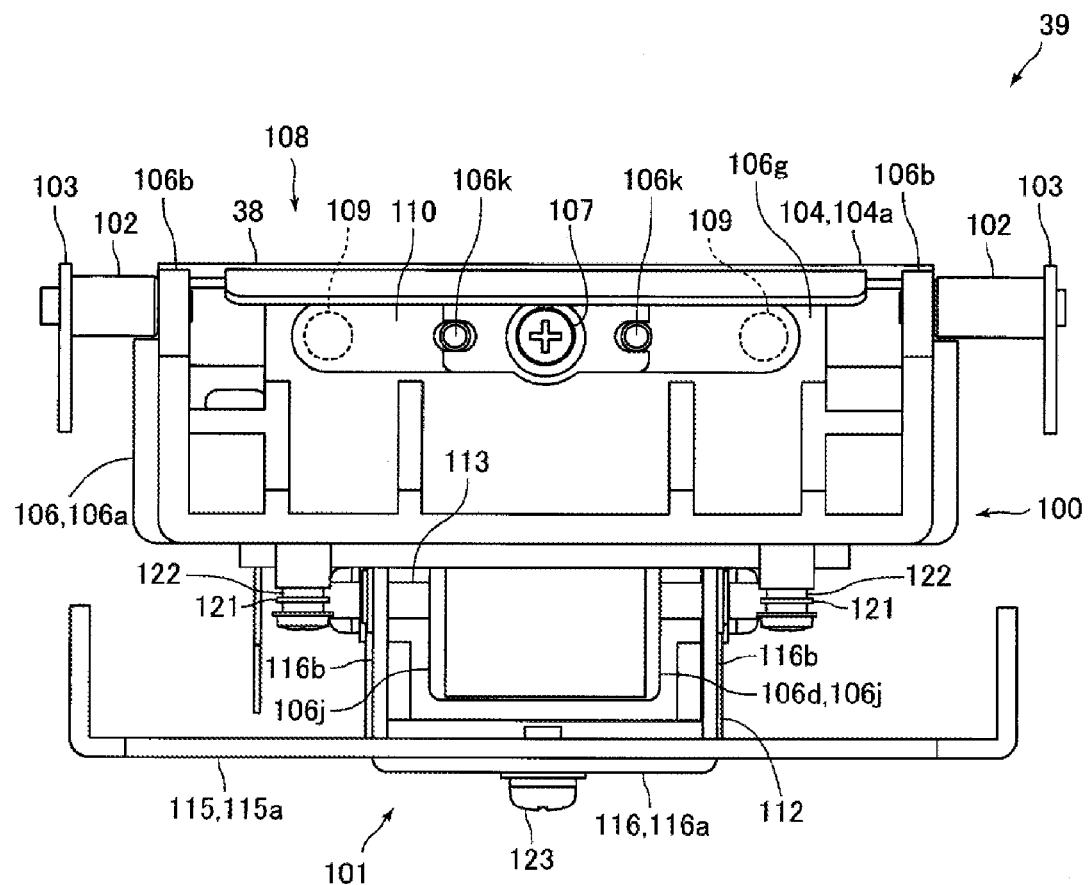
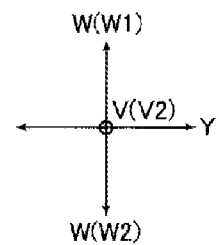

Fig. 19(A)
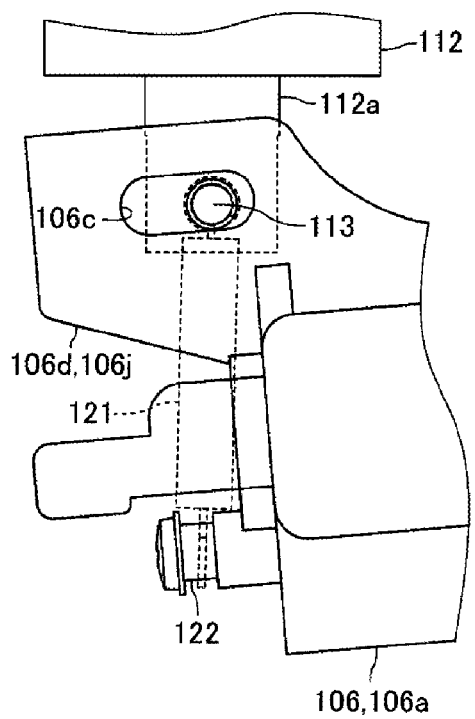
Fig. 19(B)
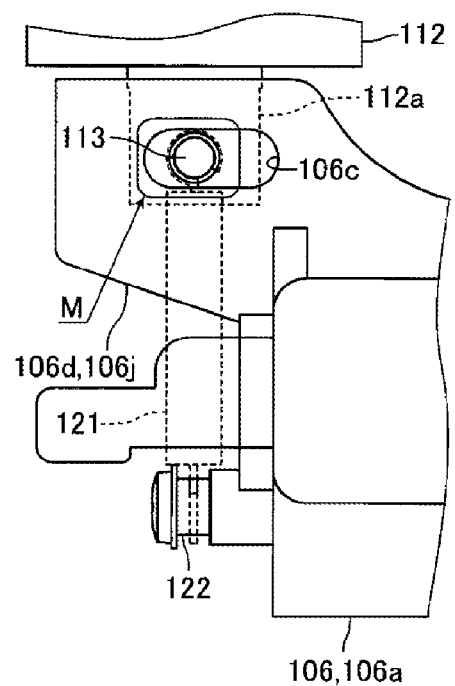
Fig. 19(C)
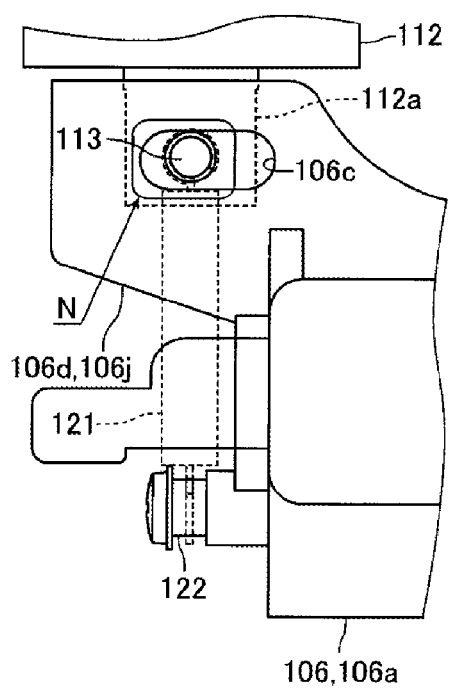
Fig. 19(D)
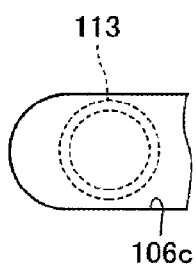
Fig. 19(E)
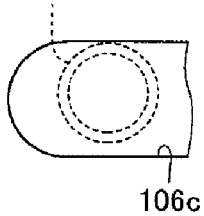
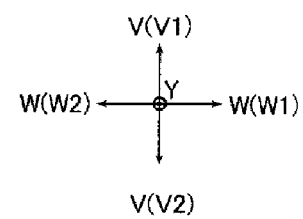

MEDIUM PROCESSING APPARATUS

This is the U.S. national stage of application No. PCT/JP2012/080811, filed on 29 Nov. 2012. Priority under 35 U.S.C. §119(a) and 35 U.S.C. §365(b) is claimed from Japanese Application No. 2011-274240, filed 15 Dec. 2011, the disclosure of which is also incorporated herein by reference.

FIELD OF THE INVENTION

At least an embodiment of the present invention relates to a medium processing apparatus which is provided with a printing function on a card-shaped medium.

The word "printing" in the present specification includes printing a figure, a sign and a pattern written on a medium in addition to printing a character written on a medium. Further, the word "print a character" in the present specification includes printing of a figure, a sign or a pattern on a medium in addition to printing of a character on a medium.

BACKGROUND

Conventionally, a medium processing apparatus provided with a printing function in which printing of a character is performed on a card in a thermal method has been known (see, for example, Patent Literature 1). The medium processing apparatus described in Patent Literature 1 includes a printing unit having a thermal head, which is structured to be abutted with a card to perform printing on a card, and a platen roller which is oppositely disposed to the thermal head. The printing unit includes, in addition to the thermal head, a solenoid which moves the thermal head in a direction where the thermal head is abutted with the platen roller and in a direction where the thermal head is separated from the platen roller, a support part which supports the thermal head, and a tension coil spring for urging the thermal head toward the platen roller. The support part includes a drive source fixing member to which the solenoid is fixed and a head fixing member to which the thermal head is fixed. The head fixing member is held by the drive source fixing member so as to be capable of turning with a turning center shaft attached to the drive source fixing member as a turning center.

In the medium processing apparatus, one end side of each of tension coil springs is engaged with each of both side faces of the head fixing member in a card widthwise direction. The other end side of each of the tension coil springs is attached to a main body of the medium processing apparatus and the head fixing member is urged toward the platen roller by the urging forces of the tension coil springs. Further, the head fixing member is formed with a shaft engaging groove with which the turning center shaft is engaged and the shaft engaging groove is formed in a "U"-groove shape which is a substantially "U" shape when viewed in a card widthwise direction. Therefore, in the medium processing apparatus, even when a card with which the thermal head is abutted is deformed, the thermal head is inclined together with the head fixing member and thereby the thermal head is capable of following the deformed card.

PATENT LITERATURE

[PTL 1] Japanese Patent Laid-Open No. 2010-234695

SUMMARY OF INVENTION

As described above, in the medium processing apparatus described in Patent Literature 1, even when a card with which the thermal head is abutted is deformed, the thermal head is capable of following the deformed card. However, in the medium processing apparatus, a tension coil spring is disposed on both sides of the head fixing member in a card widthwise direction and thus the size of the medium processing apparatus may be increased in the card widthwise direction. Further, in the medium processing apparatus, when the thermal head follows a deformed card, the head fixing member is also inclined together with the thermal head. Therefore, in the medium processing apparatus, a space for preventing interference of the head fixing member with other structural components is required to provide around the head fixing member in the card widthwise direction and thus the size of the medium processing apparatus may be increased in the card widthwise direction.

In view of the problem described above, at least an embodiment of the present invention provides a medium processing apparatus in which a thermal head is capable of following a deformed medium in a card shape and its size in a widthwise direction of the medium substantially perpendicular to a conveyance direction of the conveyed medium can be reduced.

To achieve the above, at least an embodiment of the present invention provides a medium processing apparatus including a medium conveying passage where a medium in a card shape is conveyed, a thermal head which is structured to contact with the medium passing the medium conveying passage and to perform printing, a head holding part which holds the thermal head, and a moving mechanism which moves the thermal head and the head holding part between a contact position where the thermal head is capable of contacting with the medium and a retreated position where the thermal head is retreated in a separated direction from the medium conveying passage. The head holding part includes a head holding member, a head support shaft which supports the thermal head so that the thermal head is capable of relatively turning with respect to the head holding member with a conveyance direction of the medium when the thermal head and the head holding part are located at the contact position as an axial direction of turning, and a pressing mechanism which presses the thermal head toward the head holding member in the conveyance direction of the medium when the thermal head and the head holding part are located at the contact position.

In the medium processing apparatus in accordance with at least an embodiment of the present invention, the thermal head is supported by a head support shaft so that the thermal head is capable of relatively turning with respect to the head holding member with a conveyance direction of the medium when the thermal head and the head holding part are located at the contact position as an axial direction of the turning. Further, in at least an embodiment of the present invention, the thermal head is pressed toward the head holding member by a pressing mechanism in the conveyance direction of the medium when the thermal head and the head holding part are located at the contact position. Therefore, when a pressing force of the pressing mechanism is appropriately set, the thermal head can be turned with the head support shaft as a turning center when the thermal head is abutted with a deformed medium. Accordingly, in at least an embodiment of the present invention, the thermal head is capable of following a deformed medium.

Further, in at least an embodiment of the present invention, the pressing mechanism presses the thermal head toward the head holding member in the conveyance direction of the medium when the thermal head and the head holding part are located at the contact position. Therefore, the pressing mechanism can be arranged so as not to protrude from the thermal head in a widthwise direction of the medium which is substantially perpendicular to the conveyance direction of the medium. Further, in at least an embodiment of the present invention, when the thermal head follows a deformed medium, the head holding member is not turned together with the thermal head and thus a space for preventing interference of the head holding member with other structural components in the widthwise direction of the medium is not required to provide around the head holding member. Therefore, in at least an embodiment of the present invention, the size of the medium processing apparatus can be reduced in the widthwise direction of the medium. Further, in at least an embodiment of the present invention, when the thermal head follows a deformed medium, the head holding member is not turned together with the thermal head and thus the thermal head is easily turned. Therefore, in at least an embodiment of the present invention, the followability of the thermal head for a deformed medium can be enhanced.

In at least an embodiment of the present invention, the pressing mechanism includes, for example, a rotational member, which is contacted with the thermal head and is capable of turning, and an urging member which urges the rotational member toward the thermal head. In this case, it is preferable that the rotational member is a spherical member which is formed in a spherical shape, and the urging member is a plate spring which is fixed to the head holding member at an attaching position of the head support shaft. According to this structure, a contact area of the spherical member urged toward the thermal head by the plate spring with the thermal head can be reduced and thereby a frictional resistance between the spherical member and the thermal head is reduced. Therefore, when the thermal head is contacted with a deformed medium, the thermal head is easy to follow the deformed medium. In other words, the followability of the thermal head for a deformed medium can be enhanced.

In at least an embodiment of the present invention, it is preferable that the thermal head is formed with a tapered hole in a substantially truncated cone shape where a part of the spherical member is disposed. According to this structure, positional displacement of the spherical member with respect to the thermal head can be prevented.

In at least an embodiment of the present invention, it is preferable that the rotational member is disposed on both sides with respect to the head support shaft in a widthwise direction of the medium which is substantially perpendicular to a thickness direction of the medium passing the medium conveying passage and the conveyance direction of the medium. Further, in this case, it is preferable that the rotational members which are disposed on both sides with respect to the head support shaft are disposed at substantially equal distances from the head support shaft in the widthwise direction of the medium. According to this structure, when the thermal head is contacted with a deformed medium, the rotational member is appropriately turned to easily make the thermal head follow the deformed medium. In other words, the followability of the thermal head for a deformed medium can be enhanced.

In at least an embodiment of the present invention, it is preferable that the medium processing apparatus includes a holding part support shaft which is disposed with a widthwise direction of the medium substantially perpendicular to a thickness direction of the medium passing the medium conveying passage and the conveyance direction of the medium as an axial direction and which supports the head holding part, the moving mechanism includes a solenoid, the thermal head and the head holding part are turned with the holding part support shaft as a turning center by an operation of a plunger of the solenoid and are moved between the contact position and the retreated position, and an elastic member for preventing a contact pressure of the thermal head with the medium from becoming larger than a predetermined value is disposed between the head holding member and the plunger.

In this case, for example, the moving mechanism includes a first shaft member which is fixed to the plunger with the widthwise direction of the medium as an axial direction, a link plate which is formed with a first insertion hole into which the first shaft member is inserted, the first insertion hole being formed on a base end side of the link plate, and a second shaft member which is inserted into a second insertion hole formed on a tip end side of the link plate with the widthwise direction of the medium as an axial direction and is engaged with the head holding member. Each of the first shaft member and the second shaft member is engaged with each of both ends of a tension coil spring as the elastic member, an inner diameter of the first insertion hole is substantially equal to an outer diameter of the first shaft member, and a width of the second insertion hole in a moving direction of the plunger is set to be wider than an outer diameter of the second shaft member so that the link plate is relatively movable with respect to the second shaft member in the moving direction of the plunger.

Further, in this case, for example, the moving mechanism includes a first shaft member which is fixed to the plunger with the widthwise direction of the medium as an axial direction, the head holding member is formed with an insertion hole into which the first shaft member is inserted, each of the first shaft member and the head holding member is engaged with each of both ends of a tension coil spring as the elastic member, and a width of the insertion hole in a moving direction of the plunger is set to be wider than an outer diameter of the first shaft member so that the first shaft member is relatively movable with respect to the head holding member in the moving direction of the plunger.

When the attaching position of the solenoid and the operating amount of the plunger are varied, a contact pressure of the thermal head with a medium may become larger than a predetermined value. However, according to this structure, even when the attaching position of the solenoid and the operating amount of the plunger are varied, a contact pressure of the thermal head with a medium can be prevented from becoming larger than a predetermined value.

In at least an embodiment of the present invention, it is preferable that the medium processing apparatus includes a holding part support shaft which supports the head holding part and is disposed with a widthwise direction of the medium substantially perpendicular to a thickness direction of the medium passing the medium conveying passage and the conveyance direction of the medium as an axial direction, and the moving mechanism includes a solenoid and a first shaft member which is fixed to a plunger of the solenoid with the widthwise direction of the medium as an axial direction, and the thermal head is provided with a medium contact face for contacting with the medium, and the thermal head and the head holding part are turned by an operation of the plunger with the holding part support shaft as a turning center to be moved between the contact position and the retreated position, and the first shaft member, the thermal head and the holding part support shaft are disposed in this order in the conveyance direction of the medium when viewed in the widthwise direction of the medium, and the holding part support shaft is disposed at a position which is nearer to the medium contact face than the first shaft member in the thickness direction of the medium.

According to this structure, a distance between the first shaft member as a force point and the holding part support shaft as a supporting point when the thermal head is to be turned can be set longer than a distance between the medium contact face as an operation point and the holding part support shaft as the supporting point. Therefore, even when power of the solenoid is small, the medium contact face can be contacted with a medium with a predetermined contact pressure. Further, according to this structure, a contact pressure of the medium contact face with a medium can be effectively increased.

As described above, in the medium processing apparatus in accordance with at least an embodiment of the present invention, the thermal head is capable of following a deformed medium in a card shape and the size of the medium processing apparatus in a widthwise direction of the medium substantially perpendicular to a conveyance direction of the conveyed medium can be reduced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 2(A) is a view showing a front face of a medium and FIG. 2(B) is a view showing a back face of the medium.

FIG. 3 is a perspective view showing a first head part shown in FIG. 1.

FIG. 7 is a bottom view showing the first head part shown in FIG. 3.

FIG. 8 is a view showing a part of an under face of a thermal head shown in FIG. 3.

FIG. 11(A) is a view for explaining a relationship between shaft members and guide holes shown in FIG. 6, and FIG. 11(B) is a view for explaining a relationship between shaft members and guide holes shown in FIG. 5.

FIG. 12(A) is a view for explaining a relationship between a shaft member and an insertion hole shown in FIG. 6, FIG. 12(B) is a view for explaining a relationship between a shaft member and an insertion hole shown in FIG. 5, FIG. 12(C) is a view for explaining a state that a plunger is retracted from a state shown in FIG. 12(B) and a tension coil spring is extended, FIG. 12(D) is an enlarged view showing the "H" part in FIG. 12(B), and FIG. 12(E) is an enlarged view showing the "J" part in FIG. 12(C).

FIG. 14 is a front view showing the second head part shown in FIG. 13.

FIG. 17 is a bottom view showing the second head part shown in FIG. 13.

FIG. 19(A) is a view for explaining a relationship between a shaft member and an insertion hole shown in FIG. 16, FIG. 19(B) is a view for explaining a relationship between a shaft member and an insertion hole shown in FIG. 15, FIG. 19(C) is a view for explaining a state that a plunger is retracted from a state shown in FIG. 19(B) and a tension coil spring is extended, FIG. 19(D) is an enlarged view showing the "M" part in FIG. 19(B), and FIG. 19(E) is an enlarged view showing the "N" part in FIG. 19(C).

DESCRIPTION OF EMBODIMENTS

At least an embodiment of the present invention will be described below with reference to the accompanying drawings.

(Schematic Structure of Medium Processing Apparatus)

Figure 1:
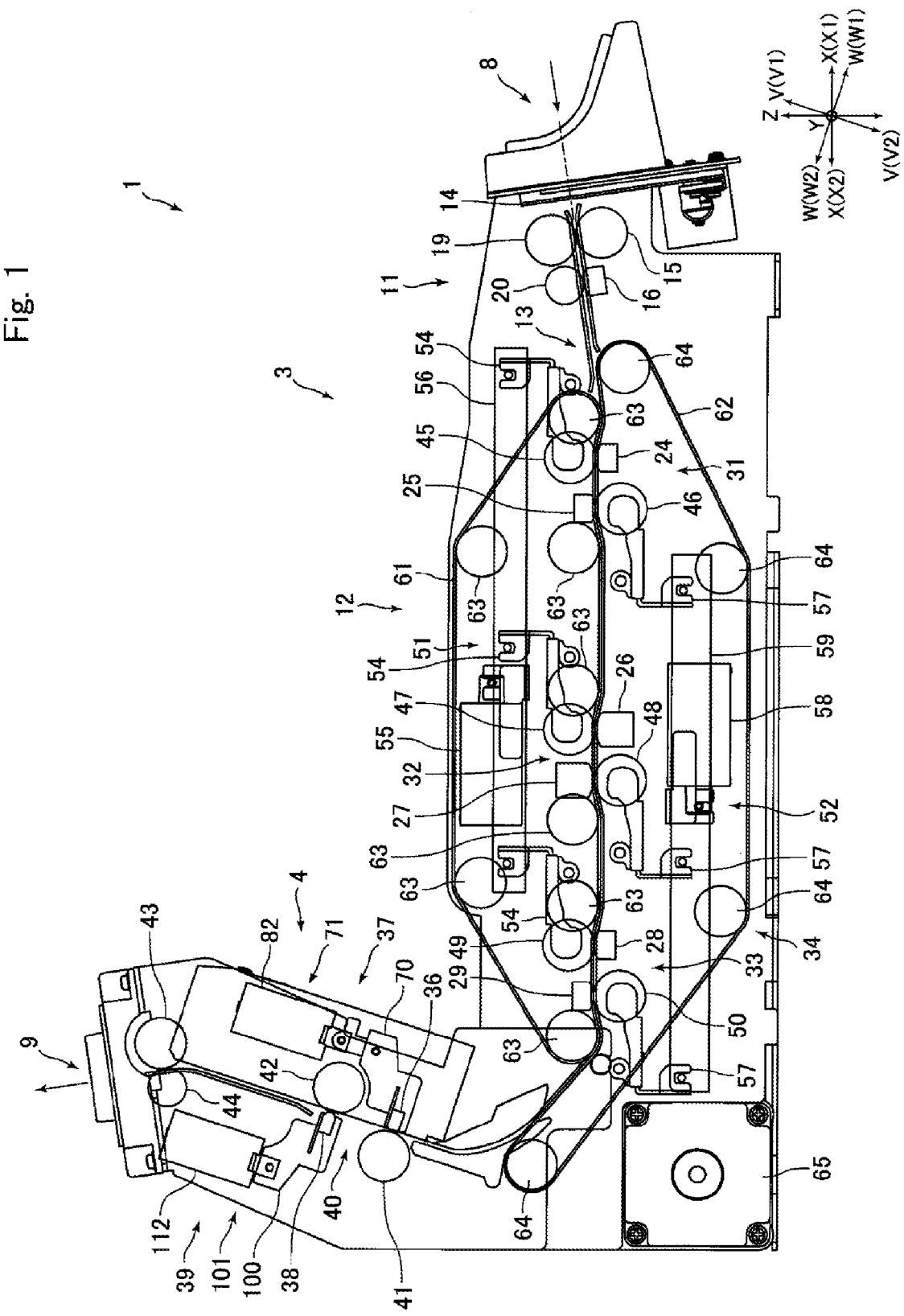
FIG. 1 is a side view for explaining a schematic structure of a medium processing apparatus in accordance with an embodiment of the present invention.
Figure 2A:
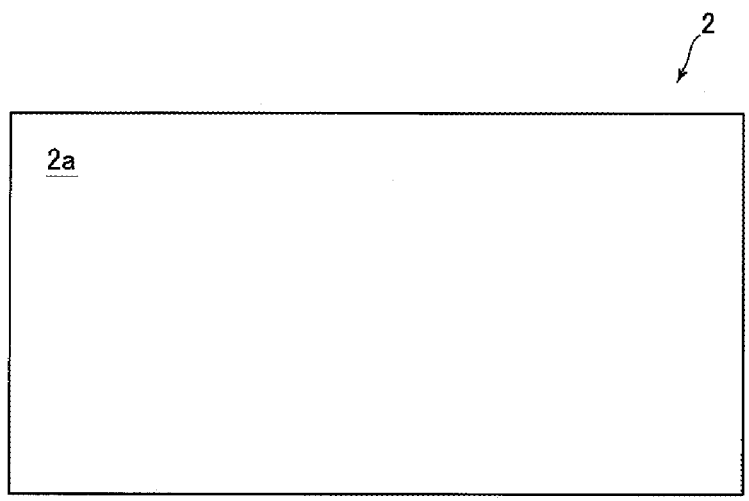
FIGS. 2(A) and 2(B) are views showing a medium which is used in the medium processing apparatus in FIG. 1.
Figure 2B:
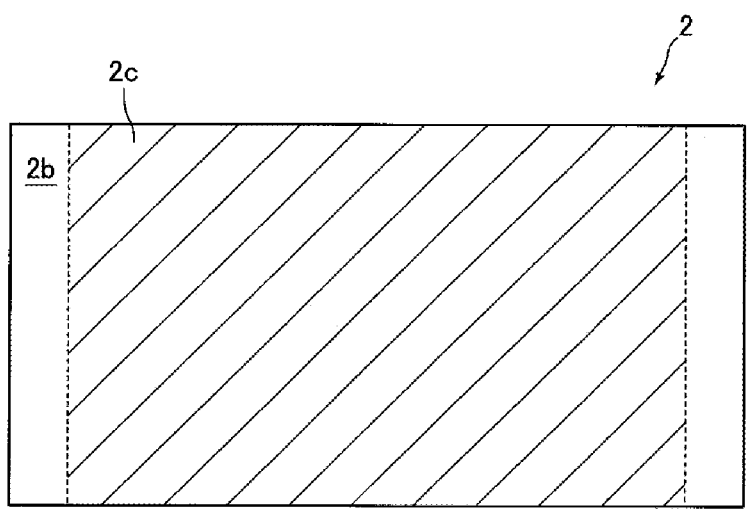

FIG. 1 is a side view for explaining a schematic structure of a medium processing apparatus 1 in accordance with an embodiment of the present invention. FIGS. 2(A) and 2(B) are views showing a medium 2 which is used in the medium processing apparatus 1 in FIG. 1. FIG. 2(A) is a view showing a front face 2a of a medium 2 and FIG. 2(B) is a view showing a back face 2b of the medium 2.

The medium processing apparatus 1 in this embodiment is, for example, an apparatus which is mounted for use on an automatic ticket gate machine installed in a ticket barrier of a station. The medium processing apparatus 1 performs reading of magnetic data recorded on a medium 2 in a card shape such as a railway ticket, writing of magnetic data to a medium 2, and printing of characters to a medium 2. The medium processing apparatus 1 includes, as shown in FIG. 1, a magnetic data processing part 3 which performs reading and writing processing of magnetic data, and a print processing part 4 which performs print processing of characters. In descriptions regarding a schematic structure of the medium processing apparatus 1, three directions perpendicular to each other are referred to as an "X" direction, a "Y" direction and a "Z" direction. In this embodiment, an upper and lower direction and the "Z" direction are coincided with each other. Further, in the descriptions regarding the schematic structure of the medium processing apparatus 1, the "Y" direction is a right and left direction, the "X" direction is a front and rear direction, an "X1" direction side is a "front" side, and an "X2" direction side is a "rear" (back) side.

A lower end of the print processing part 4 is connected with a rear end of the magnetic data processing part 3 and the medium processing apparatus 1 is formed so that its shape when viewed in the right and left direction is a roughly an "L" shape. An insertion port 8 into which a medium 2 is inserted is formed at a front end of the magnetic data processing part 3, and an eject port 9 from which the medium 2 is ejected is formed at an upper end of the print processing part 4. Further, in the magnetic data processing part 3, a medium 2 is conveyed toward the rear direction and the medium 2 is conveyed toward a substantially upper direction (specifically, obliquely front and upper direction) in the print processing part 4.

A medium 2 is, for example, a card made of paper having a predetermined thickness and is formed in a rectangular shape. A front face 2a of a medium 2 is formed with a print part on which printing is performed by a thermal method. Further, a back face 2b of the medium 2 is formed with a magnetic stripe 2c in which magnetic data are recorded.

The magnetic data processing part 3 includes a medium taking-in part 11 which is structured to take a medium 2 into the magnetic data processing part 3, and a magnetic data reading/writing part 12 for performing reading and writing of magnetic data. The medium taking-in part 11 is disposed on a front side with respect to the magnetic data reading/writing part 12. A medium conveying passage 13 through which a medium 2 is conveyed is formed in an inside of the magnetic data processing part 3.

The medium taking-in part 11 includes a shutter member 14 for closing the insertion port 8, a taking-in roller 15 for taking a medium 2 inserted into the insertion port 8 into the inside, and a pre-head 16 for detecting that the medium 2 is inserted into the medium processing apparatus 1 through the insertion port 8 in a state whether its front face 2a faces upward or its back face 2b faces upward. The taking-in roller 15 is disposed so as to face the medium conveying passage 13 from a lower side with respect to the medium conveying passage 13 and is connected with a motor 65 described below through a power transmission mechanism such as a pulley and a belt. A pad roller 19 is oppositely disposed to the taking-in roller 15 from an upper side. The pre-head 16 is disposed so as to face the medium conveying passage 13 from a lower side with respect to the medium conveying passage 13. A pad roller 20 is oppositely disposed to the pre-head 16 from an upper side.

When a medium 2 is inserted into the insertion port 8 in a state that its front face 2a faces upward, a magnetic stripe 2c on the back face 2b of the medium 2 is contacted with the pre-head 16 and thus a magnetic signal is outputted from the pre-head 16. On the other hand, when a medium 2 is inserted into the insertion port 8 in a state that its back face 2b faces upward, a magnetic signal is not outputted from the pre-head 16 even when the pre-head 16 is contacted with the medium 2. In this embodiment, it is detected whether an under face of an inserted medium 2 is provided with a magnetic stripe 2c or not based on a magnetic signal which is outputted from the pre-head 16. Further, it is detected whether a medium 2 is inserted into the insertion port 8 in a state that its front face 2a faces upward or its back face 2b faces upward by detecting existence/absence of the magnetic stripe 2c by the pre-head 16.

The magnetic data reading/writing part 12 includes a magnetic head part 31 having magnetic heads 24 and 25, a magnetic head part 32 having magnetic heads 26 and 27, a magnetic head part 33 having magnetic heads 28 and 29, and a conveying mechanism 34 for conveying a medium 2. The magnetic head part 31, the magnetic head part 32 and the magnetic head part 33 are disposed in this order from the front side toward the rear side. The magnetic head parts 31 through 33 include pad rollers 45 through 50 which are oppositely disposed to the respective magnetic heads 24 through 29. Further, the magnetic data reading/writing part 12 includes a first pad roller moving mechanism 51 which moves the pad rollers 45, 47 and 49, and a second pad roller moving mechanism 52 which moves the pad rollers 46, 48 and 50.

The magnetic head part 31 includes, as described above, the magnetic heads 24 and 25 and the pad rollers 45 and 46. The magnetic head 24 is disposed so as to face the medium conveying passage 13 from a lower side with respect to the medium conveying passage 13, and the magnetic head 25 is disposed so as to face the medium conveying passage 13 from an upper side with respect to the medium conveying passage 13. The magnetic heads 24 and 25 are reading heads for reading magnetic data recorded in a magnetic stripe 2c of a medium 2. The pad roller 45 is oppositely disposed to the magnetic head 24 from an upper side. The pad roller 46 is oppositely disposed to the magnetic head 25 from a lower side.

The magnetic head part 32 includes, as described above, the magnetic heads 26 and 27 and the pad rollers 47 and 48. The magnetic head 26 is disposed so as to face the medium conveying passage 13 from a lower side with respect to the medium conveying passage 13, and the magnetic head 27 is disposed so as to face the medium conveying passage 13 from an upper side with respect to the medium conveying passage 13. The magnetic heads 26 and 27 are writing heads which perform writing magnetic data in a magnetic stripe 2c of a medium 2. The pad roller 47 is oppositely disposed to the magnetic head 26 from an upper side. The pad roller 48 is oppositely disposed to the magnetic head 27 from a lower side.

The magnetic head part 33 includes, as described above, the magnetic heads 28 and 29 and the pad rollers 49 and 50. The magnetic head 28 is disposed so as to face the medium conveying passage 13 from a lower side with respect to the medium conveying passage 13, and the magnetic head 29 is disposed so as to face the medium conveying passage 13 from an upper side with respect to the medium conveying passage 13. The magnetic heads 28 and 29 are verifying heads which read magnetic data written in the magnetic stripe 2c of the medium 2 by the magnetic heads 26 and 27 to verify whether the magnetic data are appropriately written in the magnetic stripe 2c or not. The pad roller 49 is oppositely disposed to the magnetic head 28 from an upper side. The pad roller 50 is oppositely disposed to the magnetic head 29 from a lower side.

The first pad roller moving mechanism 51 includes three lever members 54 which turnably support respective pad rollers 45, 47 and 49, a solenoid 55, and a connection member 56 which is connected with a plunger of the solenoid 55. The lever member 54 is turnably supported by a frame of the magnetic data reading/writing part 12. Further, the lever member 54 is turnably connected with the connection member 56. In this embodiment, the pad rollers 45, 47 and 49 are moved by an operation of the solenoid 55 between positions where the pad rollers 45, 47 and 49 are capable of contacting with a medium 2 passing through the medium conveying passage 13 and positions where the pad rollers 45, 47 and 49 are retreated in a direction separated from the medium conveying passage 13.

The second pad roller moving mechanism 52 includes three lever members 57 which turnably support respective pad rollers 46, 48 and 50, a solenoid 58, and a connection member 59 which is connected with a plunger of the solenoid 58. The lever member 57 is turnably supported by a frame of the magnetic data reading/writing part 12. Further, the lever member 57 is turnably connected with the connection member 59. In this embodiment, the pad rollers 46, 48 and 50 are moved by an operation of the solenoid 58 between positions where the pad rollers 46, 48 and 50 are capable of contacting with a medium 2 passing through the medium conveying passage 13, and positions where the pad rollers 46, 48 and 50 are retreated in a direction separated from the medium conveying passage 13.

The conveying mechanism 34 includes a belt 61 which contacts with an upper face of a medium 2 and conveys the medium 2, a belt 62 which contacts with an under face of the medium 2 and conveys the medium 2, a plurality of pulleys 63 over which the belt 61 is stretched, and a plurality of pulleys 64 over which the belt 62 is stretched. The pulleys 63 and 64 are connected with a motor 65 through a power transmission mechanism such as a belt and a pulley not shown.

The print processing part 4 includes a first head part 37 having a thermal head 36 by which printing is performed on a print part of the front face 2a of a medium 2 when the medium 2 is inserted into the insertion port 8 in a state that its front face 2a faces upward, and a second head part 39 having a thermal head 38 by which printing is performed on a print part of the front face 2a of a medium 2 when the medium 2 is inserted into the insertion port 8 in a state that its back face 2b faces upward. An inside of the print processing part 4 is formed with a medium conveying passage 40 through which a medium 2 is conveyed. Further, the print processing part 4 includes platen rollers 41 and 42 which are respectively oppositely disposed to the thermal heads 36 and 38, and an eject roller 43 for ejecting a medium 2 from an eject port 9.

The thermal heads 36 and 38 are a so-called direct type thermal head which directly contacts with a front face 2a of a medium 2 passing the medium conveying passage 40 and performs printing. The thermal heads 36 and 38 may be a so-called thermal transfer type thermal head which contacts with a medium 2 through an ink ribbon and performs printing. In other words, the thermal heads 36 and 38 may be a thermal transfer type thermal head in which ink applied to an ink ribbon is heated to perform printing on a medium 2.

The thermal head 36 is disposed so as to face the medium conveying passage 40 from a substantially front side with respect to the medium conveying passage 40 and the first head part 37 is disposed on a front side of the medium conveying passage 40. The thermal head 38 is disposed so as to face the medium conveying passage 40 from a substantially rear side with respect to the medium conveying passage 40 and the second head part 39 is disposed on a rear side of the medium conveying passage 40. Further, the thermal head 36 is disposed on a lower side with respect to the thermal head 38.

The platen roller 41 is oppositely disposed to the thermal head 36 from a substantially rear side and the platen roller 42 is oppositely disposed to the thermal head 38 from a substantially front side. The platen rollers 41 and 42 are connected with the motor 65 through a power transmission mechanism such as a pulley and a belt. Further, the platen rollers 41 and 42 are disposed at positions so as to be capable of always contacting with a medium 2 passing through the medium conveying passage 40. The eject roller 43 is disposed so as to face the medium conveying passage 40 from a substantially front side with respect to the medium conveying passage 40. The eject roller 43 is connected with the motor 65 through a power transmission mechanism such as a pulley and a belt. A pad roller 44 is oppositely disposed to the eject roller 43 from a rear side.

As described above, a medium 2 is conveyed toward a roughly upper direction in the print processing part 4. Therefore, in the print processing part 4, a substantially upper and lower direction is a conveyance direction for a medium 2 in the print processing part 4 and a roughly front and rear direction is a thickness direction of a medium 2 which passes through the medium conveying passage 40. Further, in the print processing part 4, the right and left direction ("Y" direction) is a widthwise direction of a medium 2 (short widthwise direction) which is perpendicular to a thickness direction of the medium 2 and a conveyance direction of the medium 2.

Detailed structures of the first head part 37 and the second head part 39 will be described below. In the following descriptions, a conveyance direction of a medium 2 ("V" direction in FIG. 1) in the print processing part 4 is referred to as an upper and lower direction and a thickness direction of a medium 2 ("W" direction in FIG. 1) in the print processing part 4 is referred to as a front and rear direction. Further, the "V1" direction side is referred to as an "upper" side, the "V2" direction side is referred to as a "lower" side, the "W1" direction side is a "front" side, and the "W2" direction side is a rear (back) side.

(Structure of First Head Part)

Figure 4:
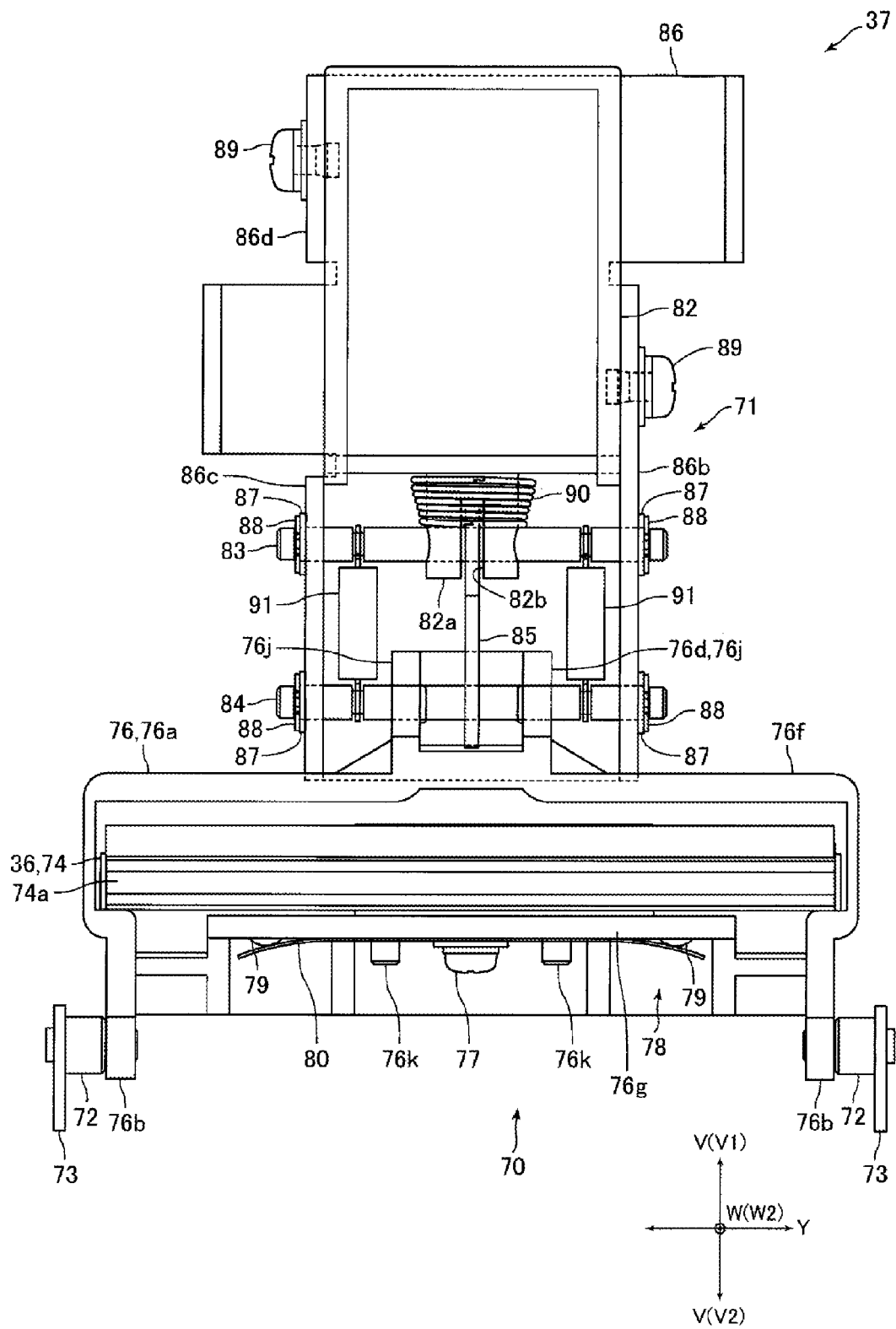
FIG. 4 is a rear view showing the first head part shown in FIG. 3.
Figure 5:
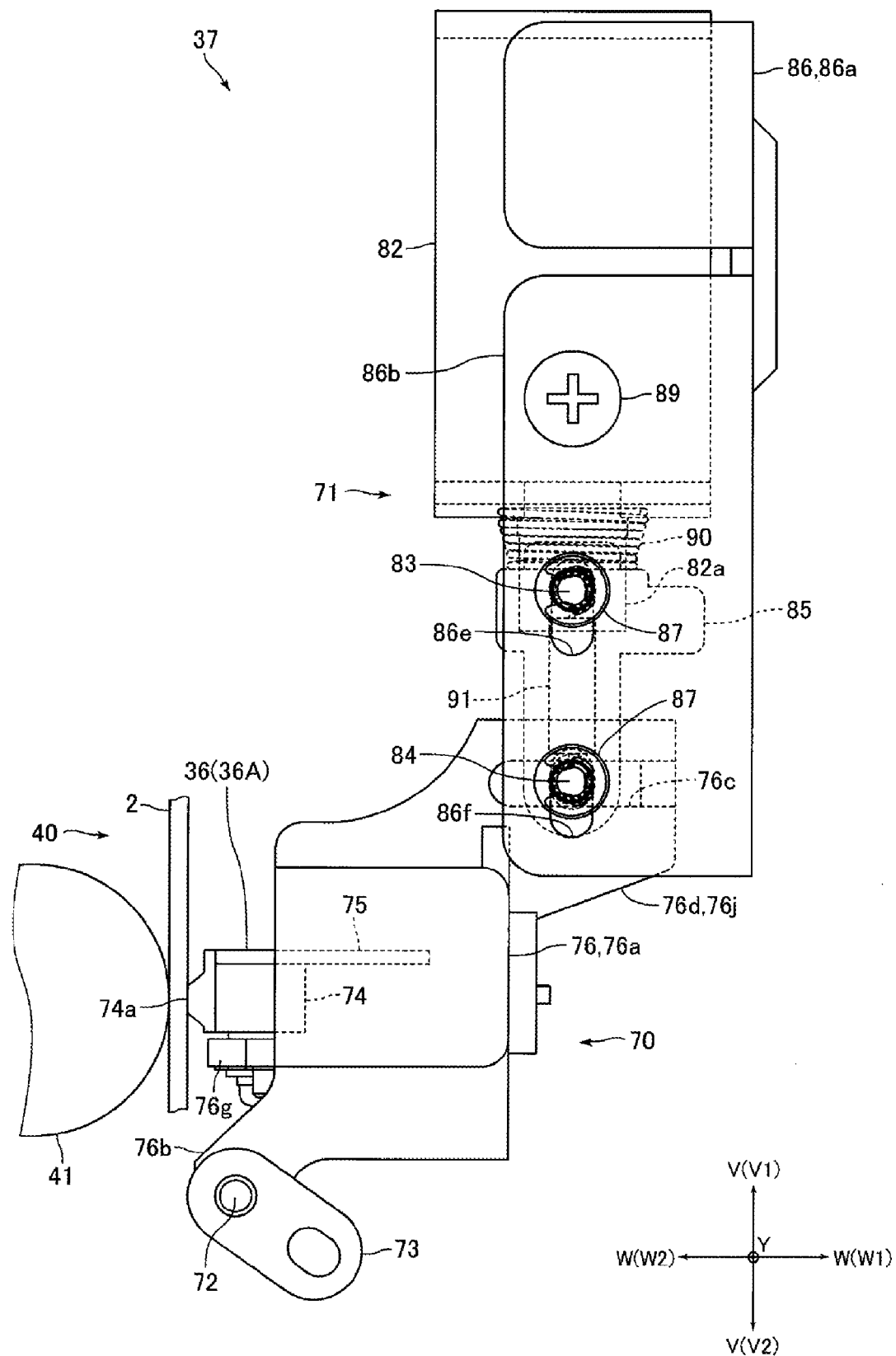
FIG. 5 is a side view showing the first head part shown in FIG. 3 when a thermal head is located at a contact position.
Figure 6:
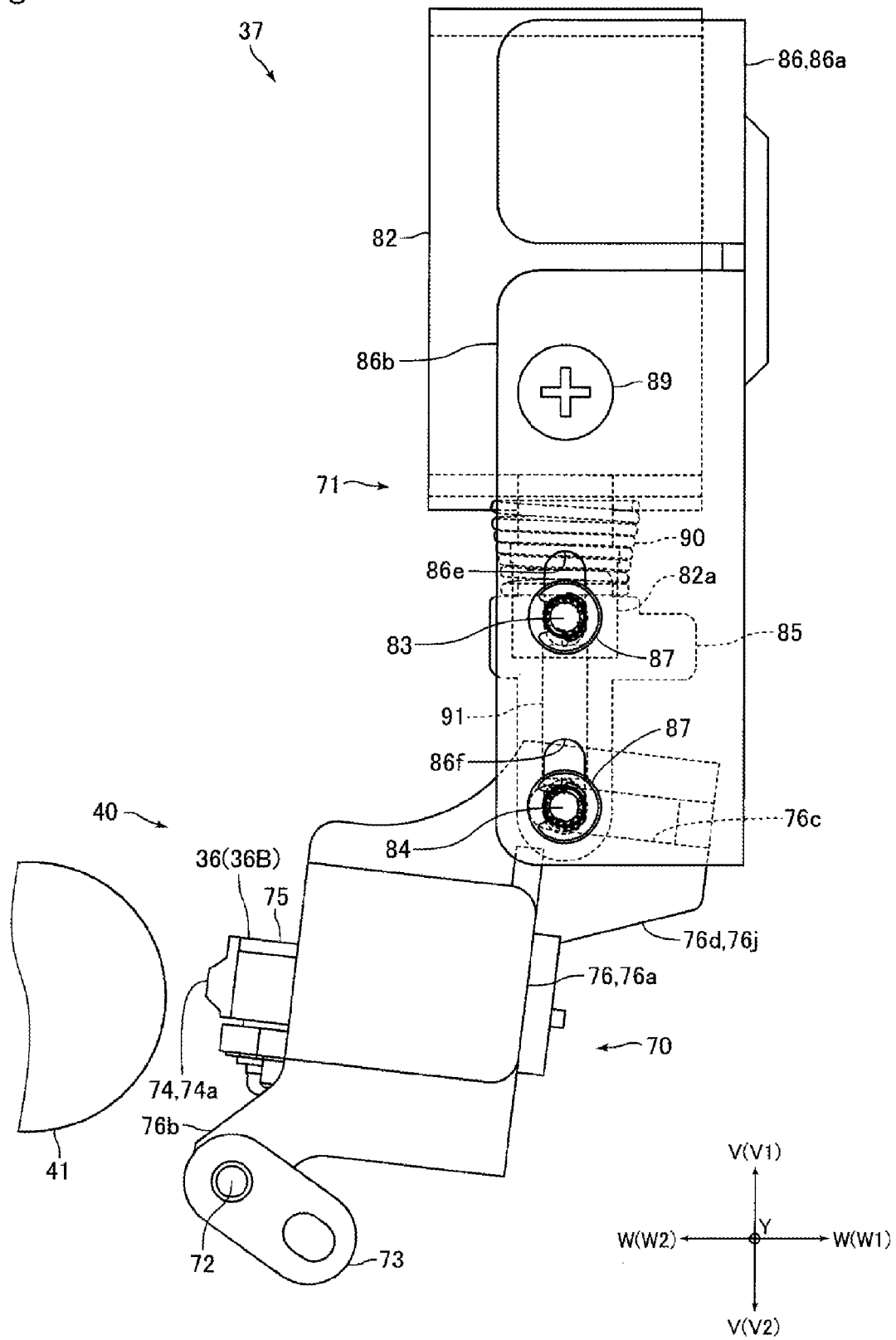
FIG. 6 is a side view showing the first head part shown in FIG. 3 when a thermal head is located at a retreated position.
Figure 9:
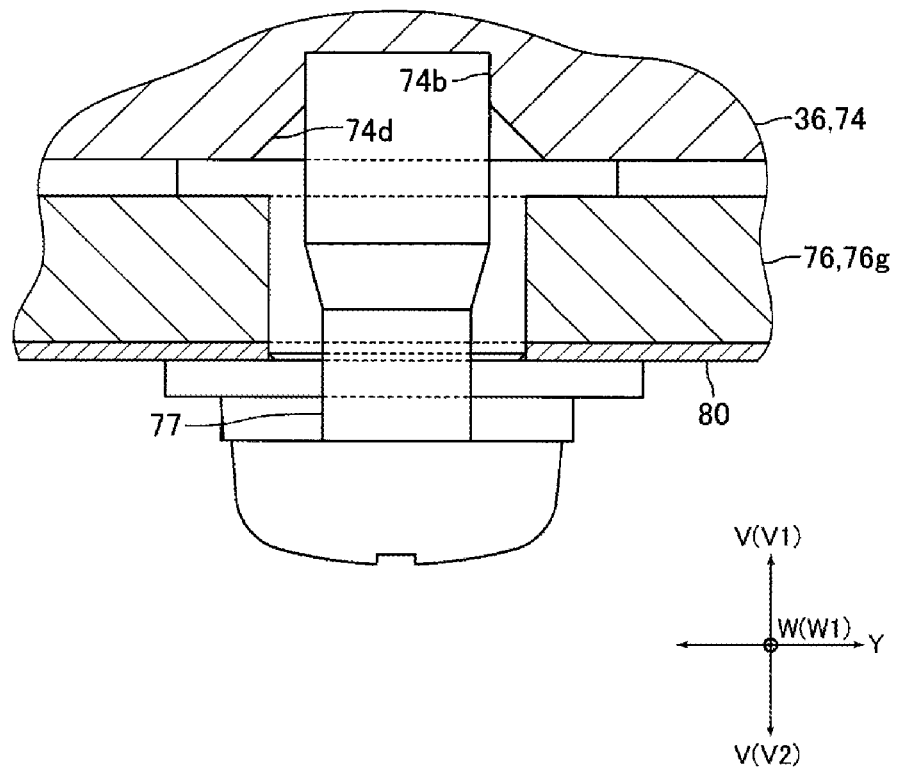
FIG. 9 is a cross-sectional view showing the "F-F" cross section in FIG. 7.
Figure 10:
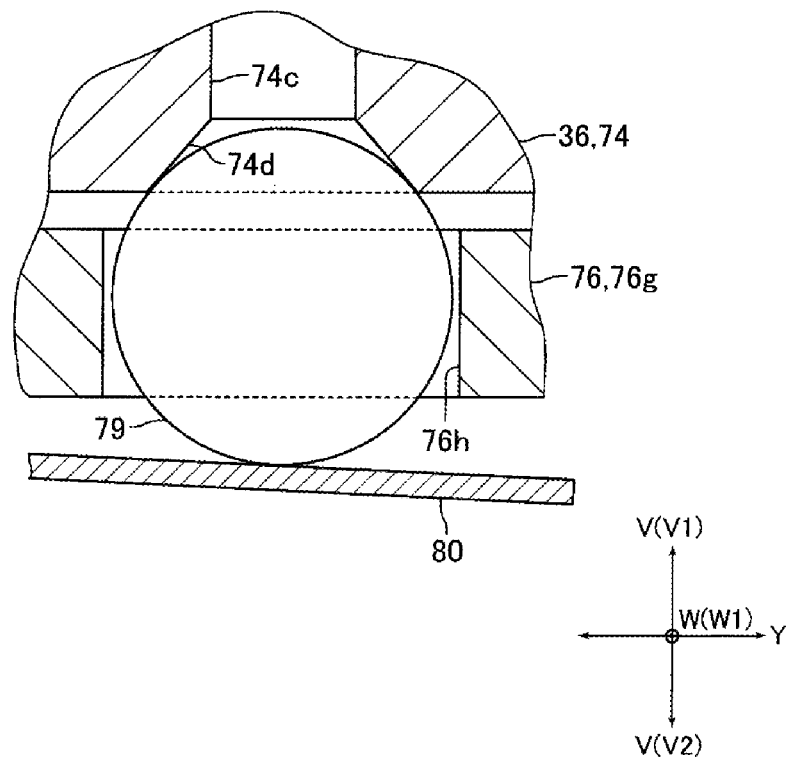
FIG. 10 is a cross-sectional view showing the "G-G" cross section in FIG. 7.

FIG. 3 is a perspective view showing the first head part 37 shown in FIG. 1. FIG. 4 is a rear view showing the first head part 37 shown in FIG. 3. FIG. 5 is a side view showing the first head part 37 shown in FIG. 3 when the thermal head 36 is located at a contact position 36A. FIG. 6 is a side view showing the first head part 37 shown in FIG. 3 when the thermal head 36 is located at a retreated position 36B. FIG. 7 is a bottom view showing the first head part 37 shown in FIG. 3. FIG. 8 is a view showing a part of an under face of the thermal head 36 shown in FIG. 3. FIG. 9 is a cross-sectional view showing the "F-F" cross section in FIG. 7. FIG. 10 is a cross-sectional view showing the "G-G" cross section in FIG. 7. FIG. 11(A) is a view for explaining a relationship between shaft members 83 and 84 and guide holes 86e and 86f shown in FIG. 6, and FIG. 11(B) is a view for explaining a relationship between the shaft members 83 and 84 and the guide holes 86e and 86f shown in FIG. 5. FIG. 12(A) is a view for explaining a relationship between a shaft member 84 and an insertion hole 85b shown in FIG. 6, FIG. 12(B) is a view for explaining a relationship between the shaft member 84 and the insertion hole 85b shown in FIG. 5, FIG. 12(C) is a view for explaining a state that a plunger 82a is retreated from a state shown in FIG. 12(B) and a tension coil spring 91 is extended, FIG. 12(D) is an enlarged view showing the "H" part in FIG. 12(B), and FIG. 12(E) is an enlarged view showing the "J" part in FIG. 12(C).

The first head part 37 includes, in addition to the thermal head 36, a head holding part 70 holding the thermal head 36 and a first moving mechanism 71 as a moving mechanism which moves the thermal head 36 and the head holding part 70 between a contact position 36A (position shown in FIG. 5) where the thermal head 36 is capable of contacting with a medium 2 passing the medium conveying passage 40 and a retreated position 36B (position shown in FIG. 6) where the thermal head 36 is retreated in a separated direction from the medium conveying passage 40. The thermal head 36 and the head holding part 70 structure a lower end side portion of the first head part 37 and the first moving mechanism 71 structures an upper end side portion of the first head part 37.

Further, the first head part 37 includes a support shaft 72 as a holding part support shaft which supports the head holding part 70. The support shaft 72 is disposed with the right and left direction as an axial direction. Further, the support shaft 72 is disposed at a lower end on the rear side of the first head part 37. An inner side end portion of the support shaft 72 in the right and left direction is, for example, fixed to the head holding part 70 and an outer side end portion of the support shaft 72 in the right and left direction is turnably supported by a fixing plate 73 which is, for example, fixed to a main body frame of the print processing part 4. The thermal head 36 and the head holding part 70 are turned with the support shaft 72 as a turning center and are moved between the contact position 36A and the retreated position 36B. In accordance with an embodiment of the present invention, it may be structured that the head holding part 70 is turnably supported by an inner side end portion of the support shaft 72 in the right and left direction and an outer side end portion of the support shaft 72 in the right and left direction is fixed to the fixing plate 73.

The thermal head 36 includes a head main body 74 and a circuit board 75. The head main body 74 is formed in a substantially rectangular solid shape which is long and thin in the right and left direction and a width of the head main body 74 (width in the right and left direction) is substantially equal to a width (short width) of a medium 2. A rear face of the head main body 74 is a medium contact face 74*a* which is to be contacted with a medium 2.

An under face of the head main body 74 is, as shown in FIG. 8, formed with a screw hole 74*b* so as to be recessed toward an upper direction. The screw hole 74*b* is formed at a substantially center position of the head main body 74 in the right and left direction. Further, the under face of the head main body 74 is formed with two screw holes 74*c*, which are similar to the screw hole 74*b*, so as to be recessed toward an upper direction. The screw hole 74*c* is formed on both sides with respect to the screw hole 74*b* in the right and left direction with a predetermined space therebetween. Further, two screw holes 74*c* are disposed at substantially equal distances from the screw hole 74*b* in the right and left direction. Inner peripheral faces on the lower end side of the screw holes 74*b* and 74*c* are formed in a tapered face 74*d* which is enlarged to an outer side in the radial direction toward a lower direction. In this embodiment, a portion where the tapered face 74*d* of the screw hole 74*c* is formed is formed in a tapered hole having a substantially truncated cone shape in which a part of a spherical member 79 described below is disposed.

The head holding part 70 is formed in a hollow shape and is provided with a head holding member 76 having a main body part 76*a* where the thermal head 36 is disposed on its inner side. The head holding member 76 is formed of resin. The head holding member 76 is, in addition to the main body part 76*a*, provided with a shaft attaching part 76*b* to which the support shaft 72 is attached and a shaft engaging part 76*d* which is formed with a shaft engaging groove 76*c* with which a shaft member 84 described below is engaged.

The main body part 76*a* is formed in a hollow and substantially rectangular parallelepiped shape whose rear face side is opened and the thermal head 36 is disposed in its inside. Specifically, the thermal head 36 is disposed in the inside of the main body part 76*a* so that the rear end side of the thermal head 36 is protruded to a rear side relative to a rear end of the main body part 76*a*. A front face of the main body part 76*a* is, as shown in FIG. 3, formed with a draw-out hole 76*e* for drawing out cables fixed to the circuit board 75 of the thermal head 36. Further, the main body part 76*a* is provided with an upper face part 76*f* structuring an upper face of the main body part 76*a* and an under face part 76*g* structuring an under face of the main body part 76*a*. The under face part 76*g* is, as shown in FIG. 10, formed with a circular through-hole 76*h* which penetrates through the under face part 76*g* in the upper and lower direction. The through-hole 76*h* is formed at two positions in the under face part 76*g* so as to correspond to the screw holes 74*c* of the head main body 74. An inner diameter of the through-hole 76*h* is set to be larger than an outer diameter of a spherical member 79 described below.

The shaft attaching part 76*b* is formed in a flat plate shape which is substantially perpendicular to the right and left direction. The shaft attaching part 76*b* is formed so as to protrude from the main body part 76*a* toward a rear and lower side. Further, the shaft attaching part 76*b* is formed at both ends of the main body part 76*a* in the right and left direction. The inner side end portion of the support shaft 72 in the right and left direction is fixed to the shaft attaching part 76*b*.

The shaft engaging part 76*d* is provided with two groove forming parts 76*j* in a flat plate shape which are substantially perpendicular to the right and left direction. The groove forming part 76*j* is formed so as to protrude from the main body part 76*a* toward a front and upper side. Further, two groove forming parts 76*j* are formed at a substantially center portion of the main body part 76*a* in the right and left direction in a separated state with a predetermined space therebetween. The shaft engaging groove 76*c* is formed in the groove forming part 76*j*. The shaft engaging groove 76*c* is formed so as to penetrate through the groove forming part 76*j* in the right and left direction and its shape when viewed in the right and left direction is formed in a "U"-groove shape which is a substantially "U"-shape whose front side is opened.

Further, the head holding part 70 includes a support shaft 77 as a head support shaft, which supports the thermal head 36 so that the thermal head 36 is capable of relatively turning with respect to the head holding member 76 with the upper and lower direction as an axial direction of turning when the thermal head 36 and the head holding part 70 are located at the contact position 36A, and a pressing mechanism 78 which presses the thermal head 36 toward the upper face part 76*f* of the head holding member 76 in the upper and lower direction when the thermal head 36 and the head holding part 70 are located at the contact position 36A.

A male screw is formed on a tip end side of the support shaft 77 and the tip end side of the support shaft 77 is fixed by being screwed into a screw hole 74*b* of the head main body 74. Further, the support shaft 77 is, as shown in FIG. 9, turnably supported by the under face part 76*g* of the head holding member 76.

The pressing mechanism 78 includes two spherical members 79 as a rotational member which are contacted with the thermal head 36 and rotatable, and a plate spring 80 as an urging member which urges the spherical member 79 toward the thermal head 36. The spherical member 79 is a ball made of steel (steel ball) which is formed in a spherical shape. The plate spring 80 is formed by a metal thin plate such as a stainless steel plate. Further, the plate spring 80 is formed in a flat plate shape having a substantially elliptical shape which is long and thin in the right and left direction. A width of the plate spring 80 in the right and left direction is smaller than a width of the thermal head 36 in the right and left direction.

Two spherical members 79 are respectively disposed on both sides with respect to the support shaft 77 in the right and left direction. Specifically, each of two spherical members 79 is, as shown in FIG. 10, disposed in each of two screw holes 74*c* so as to contact with the tapered face 74*d* of the screw hole 74*c* of the head main body 74 and is disposed in the through-hole 76*h* of the under face part 76*g* of the head holding member 76. In other words, the two spherical members 79 are respectively disposed at substantially equal distances from the support shaft 77 in the right and left direction. The lower end side of the spherical member 79 is, as shown in FIG. 10, protruded to a lower side relative to the under face of the under face part 76*g*.

A center portion of the plate spring 80 is fixed to a substantially center position of the under face of the under face part 76*g* of the head holding member 76 by the support shaft 77 which is screwed into the screw hole 74*b* of the head main body 74. Further, the plate spring 80 is formed with two through-holes into which two projections 76*k* formed on the under face of the under face part 76*g* are inserted and the plate spring 80 is positioned by the projections 76*k*. As shown in FIG. 10, each of both end sides of the plate spring 80 in the right and left direction is abutted with a lower end of the spherical member 79 in a resiliently bent state to urge the spherical member 79 to an upper direction. An upper end side of the spherical member 79 urged by the plate spring 80 is abutted with the tapered face 74d of the screw hole 74c.

The first moving mechanism 71 includes a solenoid 82, a shaft member 83 as a first shaft member which is fixed to a plunger 82a of the solenoid 82, a shaft member 84 as a second shaft member which is engaged with the head holding member 76, and a link plate 85 which connects the shaft member 84 with the shaft member 83. In this embodiment, the thermal head 36 and the head holding part 70 are turned by operation of the plunger 82a of the solenoid 82 with the support shaft 72 as a turning center and are moved between the contact position 36A and the retreated position 36B.

The shaft members 83 and 84 are formed in a long and thin and a substantially cylindrical shape. Further, the shaft member 83 and the shaft member 84 are formed in the same shape as each other and an outer diameter of the shaft member 83 and an outer diameter of the shaft member 84 are equal to each other.

The solenoid 82 is fixed to a fixed member 86. The fixed member 86 is fixed to a main body frame of the print processing part 4. The fixed member 86 is provided with a base part 86a in a flat plate shape which is parallel to a "YV" plane formed by the "Y" direction and the "V" direction, and side face parts 86b through 86d in a flat plate shape which are formed so as to be bent from both ends of the base part 86a in the right and left direction to the rear direction. The side face part 86b is formed at one end of the base part 86a in the right and left direction and the side face parts 86c and 86d are formed at the other end of the base part 86a in the right and left direction. Further, the side face parts 86b and 86c are formed over a predetermined region from a lower end of the fixed member 86 toward the upper end side and the side face part 86d is formed over a predetermined region from the upper end of the fixed member 86 toward the lower end side.

The side face parts 86b and 86c are formed with a guide hole 86e for guiding the shaft member 83 in the upper and lower direction and a guide hole 86f for guiding the shaft member 84 in the upper and lower direction. The guide holes 86e and 86f are formed so as to penetrate through the side face parts 86b and 86c in the right and left direction. Further, the guide holes 86e and 86f are formed at substantially the same position in the front and rear direction with a predetermined space therebetween in the upper and lower direction. Respective both end sides of the shaft member 83 fixed to the plunger 82a in the right and left direction as an axial direction are inserted into the guide holes 86e and respective both end sides of the shaft member 84 disposed in the right and left direction as an axial direction are inserted into the guide holes 86f. End parts of the shaft members 83 and 84 are attached with a washer 87 and a snap ring 88 for preventing the shaft members 83 and 84 from coming off from the guide holes 86e and 86f. In FIGS. 12(A) through 12(E), the guide holes 86e and 86f are not shown.

The guide holes 86e and 86f are formed in an elliptical shape whose longitudinal direction is the upper and lower direction and widths of the guide holes 86e and 86f in the upper and lower direction are wider than outer diameters of the shaft members 83 and 84. Further, a width of the guide hole 86f in the upper and lower direction is set to be smaller than a width of the guide hole 86e. The widths of the guide holes 86e and 86f in the front and rear direction are substantially equal to the outer diameters of the shaft members 83 and 84.

The side face parts 86b and 86d are formed with an elongated hole whose longitudinal direction is the upper and lower direction and a screw 89 for fixing the solenoid 82 to the fixed member 86 is inserted into the elongated hole. A tip end of the screw 89 is screwed into a main body part of the solenoid 82. In this embodiment, a fixed position in the upper and lower direction of the solenoid 82 with respect to the fixed member 86 can be adjusted by utilizing the elongated holes formed in the side face parts 86b and 86d.

The solenoid 82 is fixed to the fixed member 86 so that the plunger 82a is movable in the upper and lower direction ("V" direction). Specifically, the solenoid 82 is fixed to the fixed member 86 so that the plunger 82a is protruded to the lower direction. The shaft member 83 is fixed to the plunger 82a with the right and left direction as an axial direction. A portion of the plunger 82a between the main body part of the solenoid 82 and the shaft member 83 is inserted into a compression coil spring 90. In this embodiment, when an electric current is not supplied to a coil of the solenoid 82, the plunger 82a is protruded to a lower direction by an urging force of the compression coil spring 90 and, when an electric current is supplied to the coil of the solenoid 82, the plunger 82a is retracted against the urging force of the compression coil spring 90.

The link plate 85 is formed in a flat plate shape. As shown in FIGS. 12(A) through 12(C), a base end side (upper end side) of the link plate 85 is formed with an insertion hole 85a as a first insertion hole into which the shaft member 83 is inserted and a tip end side (lower end side) of the link plate 85 is formed with an insertion hole 85b as a second insertion hole into which the shaft member 84 is inserted. The upper end side of the link plate 85 is, as shown in FIG. 4, disposed in a slit part 82b which is formed in a tip end (lower end) of the plunger 82a. The lower end side of the link plate 85 is disposed between two groove forming parts 76j of the head holding member 76. Further, the link plate 85 is disposed at substantially center positions of the shaft members 83 and 84 in the right and left direction. In FIGS. 11(A) and 11(B), the insertion holes 85a and 85b are not shown.

The insertion hole 85a is formed in a circular shape and its inner diameter is substantially equal to an outer diameter of the shaft member 83. On the other hand, the insertion hole 85b is formed in an elliptical shape whose longitudinal direction is the upper and lower direction. A width of the insertion hole 85b in the upper and lower direction is set to be wider than an outer diameter of the shaft member 84 so that the link plate 85 can be relatively moved with respect to the shaft member 84 in the upper and lower direction. Further, a width of the insertion hole 85b in the front and rear direction is set to be substantially equal to the outer diameter of the shaft member 84.

The shaft member 84 is disposed with the right and left direction as an axial direction. A center side portion of the shaft member 84 is disposed in the shaft engaging grooves 76c of the head holding member 76. In this embodiment, a width of the shaft engaging groove 76c in the upper and lower direction is set to be wider than the outer diameter of the shaft member 84.

Two tension coil springs 91 are disposed between the head holding member 76 and the plunger 82a as an elastic member for preventing a contact pressure of the thermal head 36 with a medium 2 from becoming larger than a predetermined value. One end (upper end) of the tension coil spring 91 is engaged with the shaft member 83 and the other end (lower end) of the tension coil spring 91 is engaged with the shaft member 84. In other words, the tension coil springs 91 urge the shaft members 83 and 84 in a direction where the shaft members 83 and 84 are approached each other. Further, the two tension coil springs 91 are disposed with a predetermined space therebetween in the right and left direction. Specifically, the two tension coil springs 91 are disposed between the side face parts 86*b* and 86*c* in the right and left direction and are disposed at substantially equal distances from the link plate 85.

As shown in FIGS. 5 and 6, when viewed in the right and left direction, the shaft member 83, the thermal head 36 and the support shaft 72 are disposed in this order from the upper side. Further, when viewed in the right and left direction, the support shaft 72 is disposed at a position nearer to the medium contact surface 74*a* of the thermal head 36 relative to the shaft member 83 in the front and rear direction. Specifically, when viewed in the right and left direction, the support shaft 72 is disposed on a slightly front side in the front and rear direction with respect to the medium contact surface 74*a* which contacts with a medium 2 from a front side. In this embodiment, a distance between the shaft member 83 and the support shaft 72 is longer than a distance between the medium contact surface 74*a* and the support shaft 72.

In the first head part 37, as shown in FIG. 6, when the plunger 82*a* is protruded by the urging force of the compression coil spring 90, the thermal head 36 is separated from the platen roller 41 and is retreated from the medium conveying passage 40. In other words, when the plunger 82*a* is protruded, the thermal head 36 and the head holding part 70 are located at the retreated position 36B.

As described above, the width of the guide hole 86*f* in the upper and lower direction is smaller than the width of the guide hole 86*e* and, when the thermal head 36 is located at the retreated position 36B, as shown in FIG. 11(A), the shaft member 84 is contacted with the lower end face of the guide hole 86*f* and a gap space is formed between the shaft member 83 and the lower end face of the guide hole 86*e*. In this embodiment, the shaft member 84 is contacted with the lower end face of the guide hole 86*f* and thereby the thermal head 36 and the head holding part 70 at the retreated position 36B are positioned. Further, when the thermal head 36 is located at the retreated position 36B, as shown in FIG. 12(A), the shaft member 84 is contacted with the upper end face of the insertion hole 85*b* by the urging forces of the tension coil springs 91.

In a state that the thermal head 36 and the head holding part 70 are located at the retreated position 36B, when the plunger 82*a* is retracted as shown in FIG. 5, the shaft member 84 is contacted with the upper face of the shaft engaging groove 76*c*. Further, when the shaft member 84 is abutted with the upper face of the shaft engaging groove 76*c*, the head holding member 76 is turned in a counterclockwise direction in FIG. 5 with the support shaft 72 as a turning center and the thermal head 36 is moved in a contacting direction with the platen roller 41. In other words, when the plunger 82*a* is retracted, the thermal head 36 and the head holding part 70 are turned with the support shaft 72 as a turning center and the thermal head 36 is moved in a contacting direction with a medium 2 being passed through the medium conveying passage 40. In other words, when the plunger 82*a* is retracted, the thermal head 36 and the head holding part 70 are moved to the contact position 36A.

When the thermal head 36 is located at the contact position 36A, as shown in FIG. 11(B), in a design, a gap space is formed between the shaft member 83 and the upper end face of the guide hole 86*e* and a gap space is formed between the shaft member 84 and the upper end face of the guide hole 86*f*. Further, the thermal head 36 is moved to the contact position 36A and, when the thermal head 36 is contacted with a medium 2, as shown in FIGS. 12(B) and 12(D), the shaft member 84 is contacted with the upper end face of the insertion hole 85*b* by the urging force of the tension coil spring 91.

In this embodiment, an attaching position of the solenoid 82 and an operating amount of the plunger 82*a* are set so that the plunger 82*a* is further slightly retracted after the thermal head 36 is contacted with a medium 2. As described above, the width of the insertion hole 85*b* in the upper and lower direction is set to be wider than an outer diameter of the shaft member 84 and thus, when the plunger 82*a* is further retracted after the thermal head 36 is contacted with the medium 2, as shown in FIGS. 12(C) and 12(E), the tension coil springs 91 are extended and the link plate 85 is moved to an upper direction with respect to the shaft member 84. In this case, an attraction force of the solenoid 82 is relaxed by the urging forces of the tension coil springs 91 and thus, even when the plunger 82*a* is further retracted after the thermal head 36 is contacted with the medium 2, a contact pressure of the thermal head 36 with the medium 2 is maintained substantially constant. As described above, in this embodiment, a head pressure adjusting mechanism for maintaining a contact pressure of the thermal head 36 with a medium 2 substantially constant is structured of the shaft members 83 and 84, the link plate 85 and the tension coil springs 91. In this embodiment, the tension coil spring 91 maintains a contracted state until the thermal head 36 located at the retreated position 36B is moved to the contact position 36A and contacted with a medium 2.

(Structure of Second Head Part)

Figure 13:
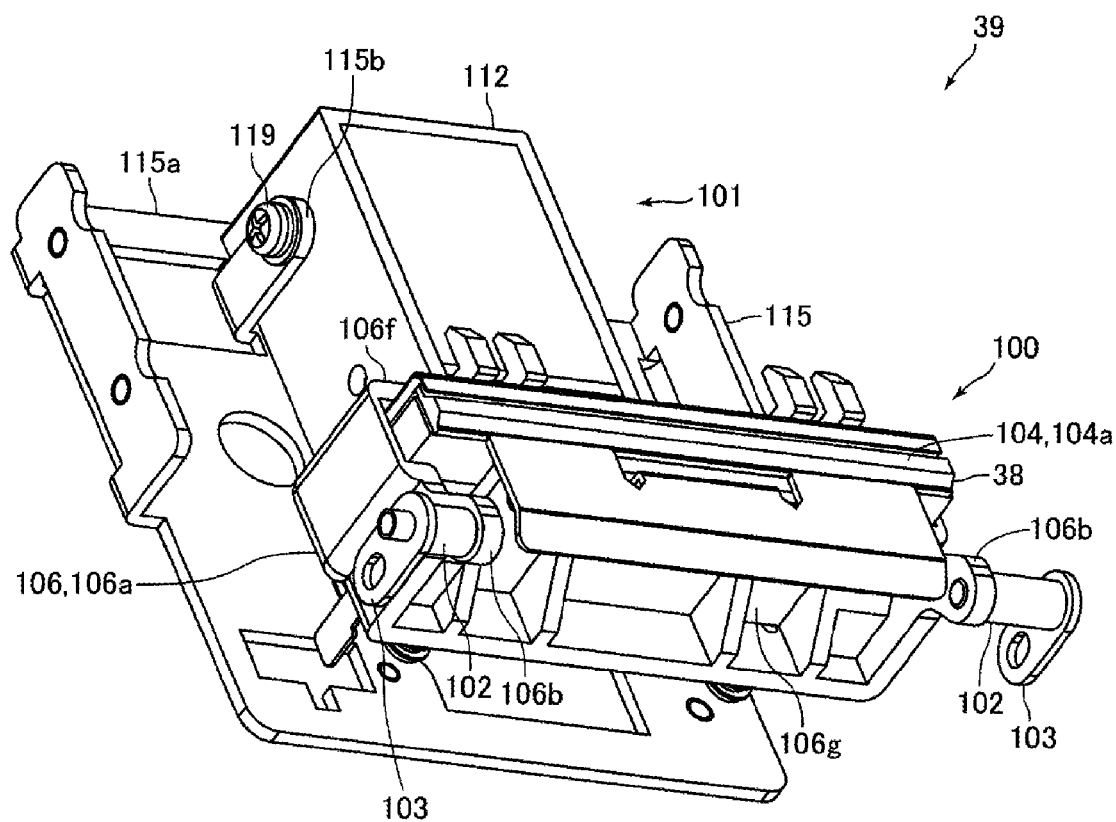
FIG. 13 is a perspective view showing a second head part shown in FIG. 1.
Figure 15:
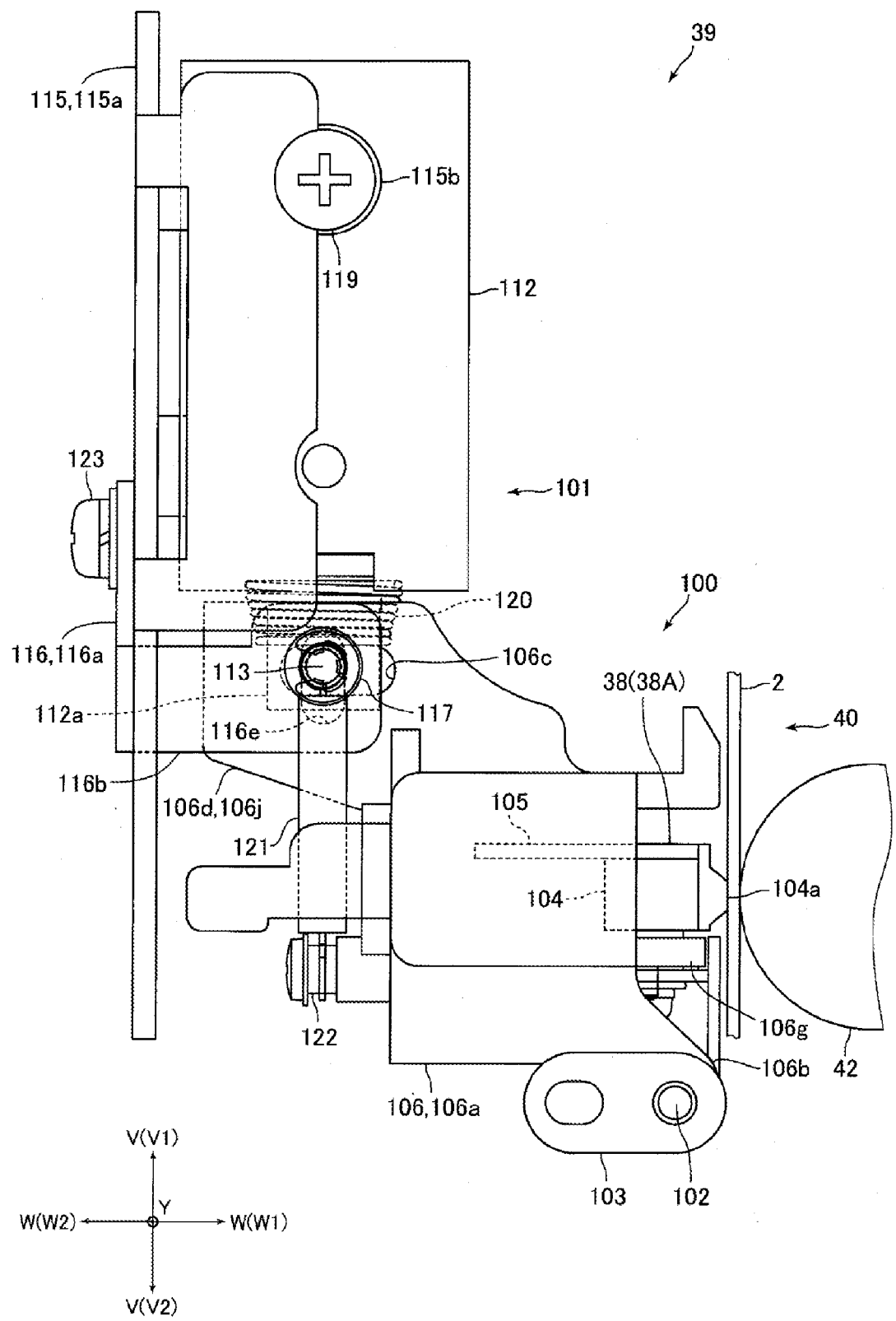
FIG. 15 is a side view showing the second head part shown in FIG. 13 when a thermal head is located at a contact position.
Figure 16:
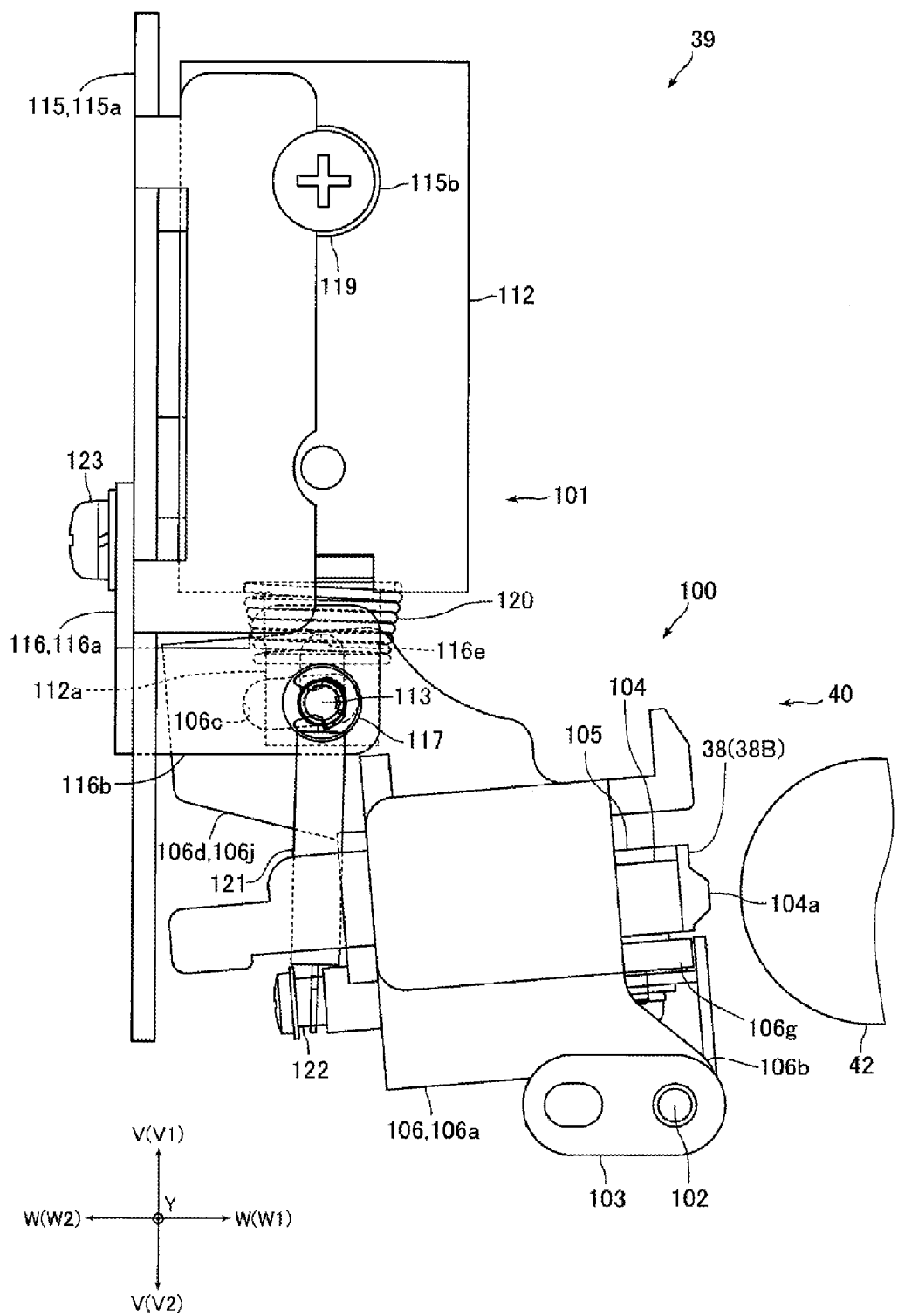
FIG. 16 is a side view showing the second head part shown in FIG. 13 when a thermal head is located at a retreated position.
Figure 18A:
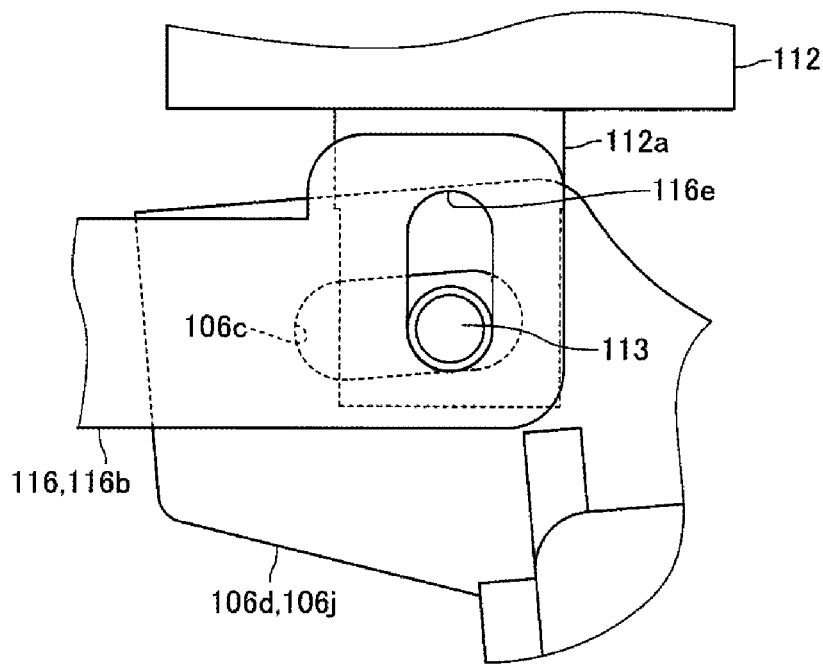
FIG. 18(A) is a view for explaining a relationship between a shaft member and a guide hole shown in FIG. 16.
Figure 18B:
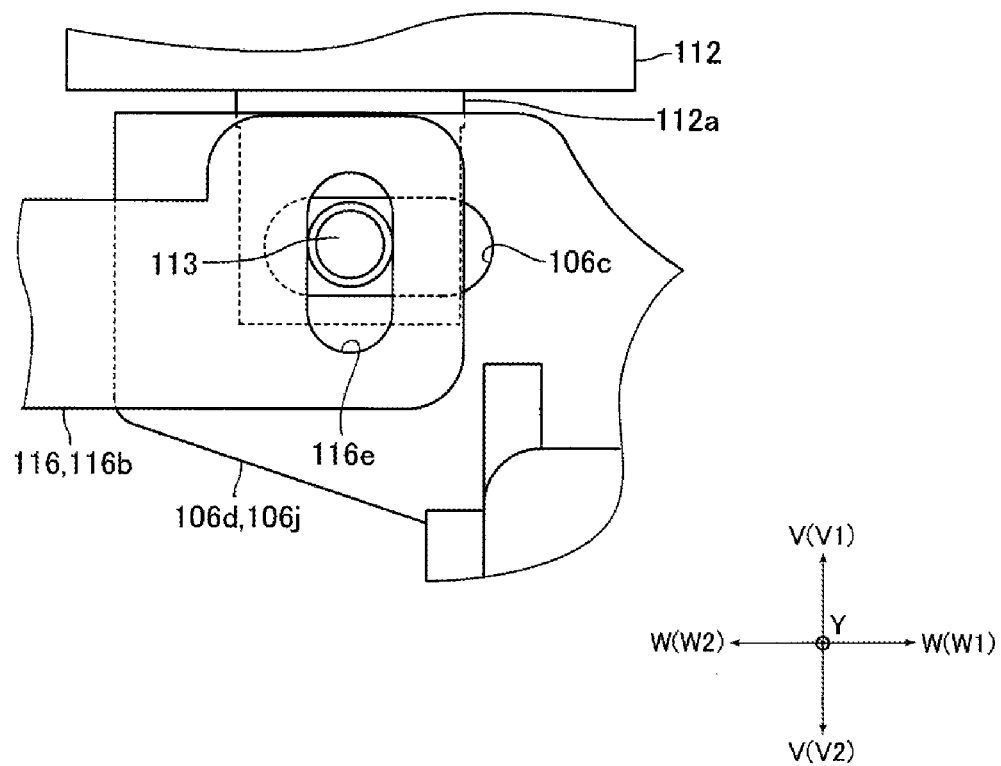
FIG. 18(B) is a view for explaining a relationship between a shaft member and a guide hole shown in FIG. 15.

FIG. 13 is a perspective view showing the second head part 39 shown in FIG. 1. FIG. 14 is a front view showing the second head part 39 shown in FIG. 13. FIG. 15 is a side view showing the second head part 39 shown in FIG. 13 when the thermal head 38 is located at a contact position 38A. FIG. 16 is a side view showing the second head part 39 shown in FIG. 13 when the thermal head 38 is located at a retreated position 38B. FIG. 17 is a bottom view showing the second head part 39 shown in FIG. 13. FIG. 18(A) is a view for explaining a relationship between a shaft member 113 and a guide hole 116*e* shown in FIG. 16, and FIG. 18(B) is a view for explaining a relationship between the shaft member 113 and the guide hole 116*e* shown in FIG. 15. FIG. 19(A) is a view for explaining a relationship between the shaft member 113 and an insertion hole 106*c* shown in FIG. 16, FIG. 19(B) is a view for explaining a relationship between the shaft member 113 and the insertion hole 106*c* shown in FIG. 15, FIG. 19(C) is a view for explaining a state that a plunger 112*a* is retracted from a state shown in FIG. 19(B) and tension coil springs 121 are extended, FIG. 19(D) is an enlarged view showing the "M" part in FIG. 19(B), and FIG. 19(E) is an enlarged view showing the "N" part in FIG. 19(C).

The second head part 39 includes, in addition to the thermal head 38, a head holding part 100 holding the thermal head 38 and a second moving mechanism 101 as a moving mechanism which moves the thermal head 38 and the head holding part 100 between a contact position 38A (position shown in FIG. 15) where the thermal head 38 is capable of contacting with a medium 2 passing the medium conveying passage 40 and a retreated position 38B (position shown in FIG. 16) where the thermal head 38 is retreated in a separated direction from the medium conveying passage 40. The thermal head 38 and the head holding part 100 structure a lower end side portion of the second head part 39 and the second moving mechanism 101 structures an upper end side portion of the second head part 39.

Further, the second head part 39 includes a support shaft 102 as a holding part support shaft which supports the head holding part 100. The support shaft 102 is disposed with the right and left direction as an axial direction. Further, the support shaft 102 is disposed at a lower end on the front side of the second head part 39. An inner side end portion of the support shaft 102 in the right and left direction is, for example, fixed to the head holding part 100 and an outer side end portion of the support shaft 102 in the right and left direction is turnably supported by a fixing plate 103 which is, for example, fixed to the main body frame of the print processing part 4. The thermal head 38 and the head holding part 100 are turned with the support shaft 102 as a turning center and are moved between the contact position 38A and the retreated position 38B. In accordance with an embodiment of the present invention, it may be structured that the head holding part 100 is turnably supported by an inner side end portion of the support shaft 102 in the right and left direction and an outer side end portion of the support shaft 102 in the right and left direction is fixed to the fixing plate 103.

The thermal head 38 includes, similarly to the thermal head 36, a head main body 104 and a circuit board 105. The head main body 104 is similarly structured to the head main body 74 and a front face of the head main body 104 is a medium contact face 104a which is to be contacted with a medium 2. Further, an under face of the head main body 104 is formed with screw holes (not shown) corresponding to the screw holes 74b and 74c. Inner peripheral faces on the lower end side of the screw holes are, similarly to the screw holes 74b and 74c, formed in a tapered face which is enlarged to an outer side in the radial direction toward a lower direction. A portion where the tapered face of the screw hole is formed is formed in a tapered hole having a substantially truncated cone shape in which a part of a spherical member 109 described below is disposed. Further, the circuit board 105 is similarly structured to the circuit board 75.

The head holding part 100 is formed in a hollow shape and is provided with a head holding member 106 having a main body part 106a where the thermal head 38 is disposed on its inner side. The head holding member 106 is formed of resin. The head holding member 106 is, in addition to the main body part 106a, provided with a shaft attaching part 106b to which the support shaft 102 is attached and a shaft insertion part 106d which is formed with a shaft insertion hole 106c into which a shaft member 113 described below is inserted.

The main body part 106a is formed in a hollow and substantially rectangular parallelepiped shape whose front face side is opened and the thermal head 38 is disposed in its inside. Specifically, the thermal head 38 is disposed in the inside of the main body part 106a so that the front end side of the thermal head 38 is protruded to the front side relative to a front end of the main body part 106a. A rear face of the main body part 106a is formed with a draw-out hole (not shown) for drawing out cables fixed to the circuit board 105 of the thermal head 38. Further, the main body part 106a is provided with an upper face part 106f structuring an upper face of the main body part 106a and an under face part 106g structuring an under face of the main body part 106a. The under face part 106g is, similarly to the above-mentioned under face part 76g, formed with a circular through-hole (not shown) which penetrates through the under face part 106g in the upper and lower direction. The through-hole is, similarly to the through-hole 76h, formed at two positions in the under face part 106g so as to correspond to screw holes of the head main body 104. An inner diameter of the through-hole is set to be larger than an outer diameter of a spherical member 109 described below.

The shaft attaching part 106b is formed in a flat plate shape which is substantially perpendicular to the right and left direction. The shaft attaching part 106b is formed so as to protrude toward a front and lower side from the main body part 106a. Further, the shaft attaching part 106b is formed at both ends of the main body part 106a in the right and left direction. The inner side end portion of the support shaft 102 in the right and left direction is fixed to the shaft attaching part 106b.

A shaft insertion part 106d is provided with two hole forming parts 106j in a flat plate shape which is substantially perpendicular to the right and left direction. The hole forming part 106j is formed so as to protrude to a rear and upper side from the main body part 106a. Further, two hole forming parts 106j are formed at a substantially center portion of the main body part 106a in the right and left direction in a separated state with a predetermined space therebetween. The insertion hole 106c is formed in the hole forming part 106j. The insertion hole 106c is formed so as to penetrate through the hole forming part 106j in the right and left direction and its shape when viewed in the right and left direction is formed in a substantially elliptical shape which is long in the front and rear direction. A width of the insertion hole 106c in the upper and lower direction is set to be wider than an outer diameter of a shaft member 113 described below.

Further, the head holding part 100 includes, as shown in FIG. 17, a support shaft 107 as a head support shaft, which supports the thermal head 38 so that the thermal head 38 is capable of relatively turning with respect to the head holding member 106 with the upper and lower direction as an axial direction of turning when the thermal head 38 and the head holding part 100 are located at the contact position 38A, and a pressing mechanism 108 which presses the thermal head 38 toward the upper face part 106f of the head holding member 106 in the upper and lower direction when the thermal head 38 and the head holding part 100 are located at the contact position 38A.

The support shaft 107 is similarly formed to the support shaft 77 and a tip end side of the support shaft 107 is, similarly to the support shaft 77, fixed by being screwed into a screw hole of the head main body 104 corresponding to the screw hole 74b. Further, the support shaft 107 is turnably supported by the under face part 106g of the head holding member 106.

The pressing mechanism 108 includes, similarly to the pressing mechanism 78, two spherical members 109 as a rotational member which are contacted with the thermal head 38 and rotatable, and a plate spring 110 as an urging member which urges the spherical members 109 toward the thermal head 38. The spherical member 109 is, similarly to the spherical member 79, a steel ball which is formed in a spherical shape. The plate spring 110 is, similarly to the plate spring 80, formed of a metal thin plate such as a stainless steel plate and is formed in a flat plate shape having a substantially elliptical shape which is long and thin in the right and left direction. A width of the plate spring 110 in the right and left direction is smaller than a width of the thermal head 38 in the right and left direction.

Two spherical members 109 are respectively disposed on both sides with respect to the support shaft 107 in the right and left direction. Specifically, each of two spherical members 109 is, similarly to the spherical member 79, disposed in each of two screw holes so as to contact with a tapered face of the screw hole of the head main body 104 corresponding to the tapered face 74d of the screw hole 74c and is disposed in a through-hole (not shown) of the under face part 106g of the head holding member 106 corresponding to the through-hole 76h of the under face part 76g of the head holding member 76. In other words, the two spherical members 109 are respectively disposed at substantially equal distances from the support shaft 107 in the right and left direction. The lower end side of the spherical member 109 is protruded to a lower side relative to the under face of the under face part 106g.

A center portion of the plate spring 110 is fixed to a substantially center position of the under face of the under face part 106g of the head holding member 106 by the support shaft 107 screwed into the screw hole of the head main body 104. Further, the plate spring 110 is formed with two through-holes into which two projections 106k (see FIG. 17) formed on the under face of the under face part 106g are inserted and the plate spring 110 is positioned by the projections 106k. Similarly to the plate spring 80, each of both end sides of the plate spring 110 in the right and left direction is abutted with a lower end of the spherical member 109 in a resiliently bent state to urge the spherical member 109 to an upper direction. An upper end side of the spherical member 109 urged by the plate spring 110 is abutted with the tapered face of the screw hole of the head main body 104 corresponding to the tapered face 74d of the screw hole 74c.

The second moving mechanism 101 includes a solenoid 112 and a shaft member 113 as a first shaft member which is fixed to a plunger 112a of the solenoid 112. The shaft member 113 is formed in a long and thin and substantially cylindrical shape similarly to the shaft members 83 and 84. In this embodiment, the thermal head 38 and the head holding part 100 are turned by operation of the plunger 112a of the solenoid 112 with the support shaft 102 as a turning center and are moved between the contact position 38A and the retreated position 38B.

The solenoid 112 is fixed to a fixed member 115. The fixed member 115 is fixed to the main body frame of the print processing part 4. The fixed member 115 is provided with a base part 115a in a flat plate shape which is parallel to a "YV" plane formed by the "Y" direction and the "V" direction, and two side face parts 115b in a flat plate shape which are formed so as to be bent from the base part 115a to a front direction. Further, the fixed member 115 is fixed with a guide member 116 in which a guide hole 116e for guiding the shaft member 113 in the upper and lower direction is formed.

The guide member 116 is formed in a substantially square groove shape and is provided with a fixed part 116a in a flat plate shape which is fixed to the base part 115a and two side face parts 116b in a flat plate shape which are formed so as to be bent from the fixed part 116a toward the front direction. The fixed part 116a is fixed to the base part 115a by a screw 123. The side face part 116b is formed at both ends in the right and left direction on the lower end side of the base part 115a. Two hole forming parts 106j of the head holding member 106 are disposed between the two side face parts 116b. A guide hole 116e is formed in each of two side face parts 116b.

The guide hole 116e is formed so as to penetrate through the side face part 116b in the right and left direction. Each of the both end sides of the shaft member 113 which is fixed to the plunger 112a with the right and left direction as an axial direction is inserted into the guide hole 116e. End parts of the shaft member 113 are attached with a washer 117 and a snap ring 118 for preventing the shaft member 113 from coming off from the guide holes 116e. Further, the guide hole 116e is formed in an elliptical shape whose longitudinal direction is the upper and lower direction and a width of the guide hole 116e in the upper and lower direction is set to be wider than the outer diameter of the shaft member 113. A width of the guide hole 116e in the front and rear direction is substantially equal to the outer diameter of the shaft member 113. In FIGS. 19(A) through 19(E), the guide hole 116e is not shown.

The side face parts 115b are formed with an elongated hole whose longitudinal direction is the upper and lower direction and a screw 119 for fixing the solenoid 112 to the fixed member 115 is inserted into the elongated hole. A tip end of the screw 119 is screwed into a main body part of the solenoid 112. In this embodiment, a fixed position of the solenoid 112 with respect to the fixed member 115 can be adjusted in the upper and lower direction by utilizing the elongated holes formed in the side face parts 115b.

The solenoid 112 is, similarly to the solenoid 82, fixed to the fixed member 115 so that the plunger 112a is movable in the upper and lower direction ("V" direction). Specifically, the solenoid 112 is fixed to the fixed member 115 so that the plunger 112a is protruded to the lower direction. The shaft member 113 is fixed to the plunger 112a with the right and left direction as an axial direction. A portion of the plunger 112a between the main body part of the solenoid 112 and the shaft member 113 is inserted into a compression coil spring 120. In this embodiment, when an electric current is not supplied to a coil of the solenoid 112, the plunger 112a is protruded to a lower direction by an urging force of the compression coil spring 120 and, when an electric current is supplied to the coil of the solenoid 112, the plunger 112a is retracted against the urging force of the compression coil spring 120.

Two tension coil springs 121 are disposed between the head holding member 106 and the plunger 112a as an elastic member for preventing a contact pressure of the thermal head 38 with a medium 2 from becoming larger than a predetermined value. One end (upper end) of the tension coil spring 121 is engaged with the shaft member 113 and the other end (lower end) of the tension coil spring 121 is engaged with a screw 122 which is fixed to a rear face of the main body part 106a of the head holding member 106. In other words, the tension coil springs 121 urge the shaft member 113 and the head holding member 106 in a direction where a rear face side of the main body part 106a and the shaft member 113 are approached each other. Further, two tension coil springs 121 are disposed with a predetermined space therebetween in the right and left direction. Specifically, two tension coil springs 121 are disposed on outer sides of the side face parts 116b in the right and left direction and are disposed at substantially equal distances from the side face parts 116b.

As shown in FIGS. 15 and 16, when viewed in the right and left direction, the shaft member 113, the thermal head 38 and the support shaft 102 are disposed in this order from the upper side. Further, when viewed in the right and left direction, the support shaft 102 is disposed at a position nearer to the medium contact surface 104a of the thermal head 38 relative to the shaft member 113 in the front and rear direction. Specifically, when viewed in the right and left direction, the support shaft 102 is disposed on a slightly rear side in the front and rear direction with respect to the medium contact surface 104a contacting with a medium 2 from a rear side. In this embodiment, a distance between the shaft member 113 and the support shaft 102 is longer than a distance between the medium contact surface 104a and the support shaft 102.

In the second head part 39, as shown in FIG. 16, when the plunger 112a is protruded by the urging force of the compression coil spring 120, the thermal head 38 is separated from the platen roller 42 and is retreated from the medium conveying passage 40. In other words, when the plunger 112a is protruded, the thermal head 38 and the head holding part 100 are located at the retreated position 38B. When the thermal head 38 is located at the retreated position 38B, as shown in FIG. 18(A), the shaft member 113 is contacted with the lower end face of the guide hole 116e. In this embodiment, the shaft member 113 is contacted with the lower end face of the guide hole 116e and thereby the thermal head 38 and the head holding part 100 located at the retreated position 38B are positioned. Further, when the thermal head 38 is located at the retreated position 38B, as shown in FIG. 18(A), the shaft member 113 is contacted with a side face on the lower side of the insertion hole 106c by the urging force of the tension coil spring 121.

In a state that the thermal head 38 and the head holding part 100 are located at the retreated position 38B, when the plunger 112a is retracted as shown in FIG. 15, the head holding member 106 is pulled by the tension coil springs 121 and is turned in a clockwise direction in FIG. 15 with the support shaft 102 as a turning center and the thermal head 38 is moved in a contacting direction with the platen roller 42. In other words, when the plunger 112a is retracted, the thermal head 38 and the head holding part 100 are turned with the support shaft 102 as a turning center and the thermal head 38 is moved in a direction so as to contact with a medium 2 passing the medium conveying passage 40. In other words, when the plunger 112a is retracted, the thermal head 38 and the head holding part 100 are moved to the contact position 38A.

When the thermal head 38 is located at the contact position 38A, as shown in FIG. 18(B), in a design, a gap space is formed between the shaft member 113 and the upper end face of the guide hole 116e. Further, when the thermal head 38 is moved to the contact position 38A and is contacted with a medium 2, as shown in in a design, a gap space is formed between the shaft member 113 and the upper face of the insertion hole 106c.

In this embodiment, an attaching position of the solenoid 112 and an operating amount of the plunger 112a are set so that the plunger 112a is further slightly retracted after the thermal head 38 is contacted with a medium 2. As described above, when the thermal head 38 is contacted with a medium 2, a gap space is formed between the shaft member 113 and the upper face of the insertion hole 106c. Therefore, when the plunger 112a is further retracted after the thermal head 38 is contacted with a medium 2, as shown in FIGS. 19(C) and 19(E), the tension coil springs 121 are extended and the shaft member 113 is moved to an upper direction with respect to the shaft insertion part 106d of the head holding member 106. In this case, an attraction force of the solenoid 112 is relaxed by the urging force of the tension coil spring 121 and thus, even when the plunger 112a is further retracted after the thermal head 38 is contacted with a medium 2, a contact pressure of the thermal head 38 with a medium 2 is maintained substantially constant. As described above, in this embodiment, a head pressure adjusting mechanism for maintaining a contact pressure of the thermal head 38 with a medium 2 substantially constant is structured of the shaft member 113, the insertion hole 106c of the shaft insertion part 106d and the tension coil spring 121. In this embodiment, the tension coil spring 121 maintains a contracted state until the thermal head 38 located at the retreated position 38B is moved to the contact position 38A and contacted with a medium 2.

(Schematic Operation of Medium Processing Apparatus)

In the medium processing apparatus 1 structured as described above, when the power supply is in an "ON" state and the apparatus 1 is in a standby state that a medium 2 is not inserted, the pad rollers 45 through 50 are retreated in a direction separated from the medium conveying passage 13. Further, the thermal heads 36 and 38 are located at the retreated positions 36B and 38B. In this state, a medium 2 is inserted into the insertion port 8 and, when it is detected that the medium 2 is inserted into the insertion port 8 in a state that its front face 2a faces upward based on a detection result by the pre-head 16, the first pad roller moving mechanism 51 is operated and the pad rollers 45, 47 and 49 are moved to positions capable of contacting with the medium 2 passing the medium conveying passage 13.

In this state, when the medium 2 is conveyed, first, magnetic data recorded in a magnetic stripe 2c of the recording medium 2 are read by the magnetic head 24. After that, magnetic data are written in the magnetic stripe 2c by the magnetic head 26 and then, magnetic data written in the magnetic stripe 2c by the magnetic head 26 are read by the magnetic head 28 to be confirmed whether the magnetic data are appropriately written in the magnetic stripe 2c or not.

After that, the first moving mechanism 71 is operated and the thermal head 36 located at the retreated position 36B is moved to the contact position 36A. In this state, when the medium 2 is conveyed, printing is performed on the front face 2a of the medium 2 by the thermal head 36 and the medium 2 after printing has been performed is ejected from the eject port 9.

On the other hand, when it is detected that the medium 2 is inserted into the insertion port 8 in a state that its back face 2b faces upward based on a detection result by the pre-head 16, the second pad roller moving mechanism 52 is operated and the pad rollers 46, 48 and 50 are moved to positions capable of contacting with the medium 2 passing the medium conveying passage 13. In this state, when the medium 2 is conveyed, first, magnetic data recorded in a magnetic stripe 2c of the medium 2 are read by the magnetic head 25. After that, magnetic data are written in the magnetic stripe 2c by the magnetic head 27 and then, magnetic data written in the magnetic stripe 2c by the magnetic head 27 are read by the magnetic head 29 to be confirmed whether the magnetic data are appropriately written in the magnetic stripe 2c or not.

After that, the second moving mechanism 101 is operated and the thermal head 38 located at the retreated position 38B is moved to the contact position 38A. In this state, when the medium 2 is conveyed, printing is performed on the front face 2a of the medium 2 by the thermal head 38 and the medium 2 after printing has been performed is ejected from the eject port 9.

(Principal Effects in this Embodiment)

As described above, in this embodiment, the thermal head 36 is supported by the support shaft 77 so that the thermal head 36 can be relatively turned with respect to the head holding member 76 with the support shaft 77 as a turning center. Further, in this embodiment, the thermal head 36 is pressed toward the upper face part 76f of the head holding member 76 by the pressing mechanism 78. Therefore, when a pressing force of the pressing mechanism 78 is appropriately set, the thermal head 36 can be turned with the support shaft 77 as a turning center when the thermal head 36 is abutted with a deformed medium 2. Accordingly, in this embodiment, the thermal head 36 is capable of following a deformed medium 2.

In this embodiment, a width of the plate spring 80 in the right and left direction which structures the pressing mechanism 78 is set to be smaller than a width of the thermal head 36 in the right and left direction. Further, in this embodiment, when the thermal head 36 follows a deformed medium 2, the head holding member 76 is not turned together with the thermal head 36 and thus a space for preventing interference of the head holding member 76 with other structural components in the right and left direction is not required to provide around the head holding member 76. Therefore, in this embodiment, the size of the first head part 37 in the right and left direction can be reduced. Further, in this embodiment, when the thermal head 36 follows a deformed medium 2, the head holding member 76 is not turned together with the thermal head 36 and thus the thermal head 36 is easily turned. Therefore, in this embodiment, followability of the thermal head 36 for a deformed medium 2 can be enhanced.

Similarly, in this embodiment, the thermal head 38 is supported by the support shaft 107 so that the thermal head 38 can be relatively turned with respect to the head holding member 106 with the support shaft 107 as a turning center, and the thermal head 38 is pressed toward the upper face part 106f of the head holding member 106 by the pressing mechanism 108. Therefore, when a pressing force of the pressing mechanism 108 is appropriately set, the thermal head 38 can be turned with the support shaft 107 as a turning center when the thermal head 38 is abutted with a deformed medium 2. Accordingly, in this embodiment, the thermal head 38 is capable of following a deformed medium 2.

Further, in this embodiment, a width of the plate spring 110 in the right and left direction which structures the pressing mechanism 108 is set to be smaller than a width of thermal head 38 in the right and left direction. In addition, when the thermal head 38 follows a deformed medium 2, the head holding member 106 is not turned together with the thermal head 38 and thus a space for preventing interference of the head holding member 106 with other structural components in the right and left direction is not required to provide around the head holding member 106. Therefore, in this embodiment, the size of the second head part 39 in the right and left direction can be reduced. Further, in this embodiment, when the thermal head 38 follows a deformed medium 2, the head holding member 106 is not turned together with the thermal head 36 and thus the thermal head 38 is easily turned. Therefore, in this embodiment, the followability of the thermal head 38 for a deformed medium 2 can be enhanced.

In this embodiment, the pressing mechanism 78 is structured of two spherical members 79 contacting with the thermal head 36 and the plate spring 80 which urges the spherical members 79 toward the thermal head 36. Therefore, a contact area of the spherical member 79 urged toward the thermal head 36 by the plate spring 80 with the thermal head 36 can be reduced and thereby a frictional resistance between the spherical member 79 and the thermal head 36 is reduced. Accordingly, in this embodiment, when the thermal head 36 is contacted with a deformed medium 2, the thermal head 36 is easy to follow the deformed medium 2. In other words, in this embodiment, the followability of the thermal head 36 for a deformed medium 2 can be enhanced.

Similarly, in this embodiment, the pressing mechanism 108 is structured of two spherical members 109 contacting with the thermal head 38 and the plate spring 110 which urges the spherical members 109 toward the thermal head 38. Therefore, a contact area of the spherical member 109 urged toward the thermal head 38 by the plate spring 110 with the thermal head 38 can be reduced and thereby a frictional resistance between the spherical member 109 and the thermal head 38 is reduced. Accordingly, in this embodiment, when the thermal head 38 is contacted with a deformed medium 2, the thermal head 38 is easy to follow the deformed medium 2. In other words, in this embodiment, the followability of the thermal head 38 for a deformed medium 2 can be enhanced.

In this embodiment, the spherical member 79 is disposed in an inside of the screw hole 74c so as to contact with the tapered face 74d of the screw hole 74c of the head main body 74. Therefore, in this embodiment, positional displacement of the spherical member 79 with respect to the thermal head 36 can be prevented. Similarly, in this embodiment, the spherical member 109 is disposed in an inside of the screw hole so as to contact with the tapered face of the screw hole of the head main body 104 corresponding to the tapered face 74d of the screw hole 74c and thus positional displacement of the spherical member 109 with respect to the thermal head 38 can be prevented.

In this embodiment, two spherical members 79 are respectively disposed on both sides with respect to the support shaft 77 in the right and left direction and, in addition, respectively disposed at substantially equal distances from the support shaft 77. Therefore, when the thermal head 36 is contacted with a deformed medium 2, the spherical member 79 is appropriately turned to easily make the thermal head 36 follow the deformed medium 2. In other words, in this embodiment, the followability of the thermal head 38 for a deformed medium 2 can be enhanced.

Similarly, in this embodiment, two spherical members 109 are respectively disposed on both sides with respect to the support shaft 107 in the right and left direction and, in addition, respectively disposed at substantially equal distances from the support shaft 107. Therefore, when the thermal head 38 is contacted with a deformed medium 2, the spherical member 109 is appropriately turned to easily make the thermal head 38 follow the deformed medium 2. In other words, in this embodiment, the followability of the thermal head 38 for a deformed medium 2 can be enhanced.

In this embodiment, after the thermal head 36 is contacted with a medium 2, the plunger 82a is further retracted. Therefore, even when the attaching position of the solenoid 82 and the operating amount of the plunger 82a are varied, the thermal head 36 can be surely contacted with the medium 2. Further, in this embodiment, when the plunger 82a is further retracted after the thermal head 36 is contacted with a medium 2, the tension coil spring 91 is extended and the link plate 85 is moved to an upper direction with respect to the shaft member 84. Therefore, in this case, an attraction force of the solenoid 82 is relaxed by the urging force of the tension coil spring 91. Accordingly, in this embodiment, as described above, even when the plunger 82a is further retracted after the thermal head 36 is contacted with a medium 2, a contact pressure of the thermal head 36 with the medium 2 is maintained to be substantially constant. Further, in this embodiment, an attraction force of the solenoid 82 is relaxed by the urging force of the tension coil spring 91 and thus, even when the attaching position of the solenoid 82 and the operating amount of the plunger 82a are varied, a contact pressure of the thermal head 36 with a medium 2 can be maintained to be substantially constant. In other words, in this embodiment, a contact pressure of the thermal head 36 with a medium 2 can be prevented from becoming larger than a predetermined value.

Similarly, in this embodiment, after the thermal head 38 is contacted with a medium 2, the plunger 112a is further retracted and thus, even when the attaching position of the solenoid 112 and the operating amount of the plunger 112a are varied, the thermal head 38 can be surely contacted with the medium 2. Further, in this embodiment, when the plunger 112a is further retracted after the thermal head 38 is contacted with a medium 2, the tension coil spring 121 is extended and the shaft member 113 is moved to an upper direction with respect to the shaft insertion part 106d of the head holding member 106. Therefore, in this case, an attraction force of the solenoid 112 is relaxed by the urging force of the tension coil spring 121. Accordingly, in this embodiment, as described above, even when the plunger 112a is further retracted after the thermal head 38 is contacted with a medium 2, a contact pressure of the thermal head 38 with the medium 2 is maintained to be substantially constant. Further, in this embodiment, an attraction force of the solenoid 112 is relaxed by the urging force of the tension coil spring 121 and thus, even when the attaching position of the solenoid 112 and the operating amount of the plunger 112a are varied, a contact pressure of the thermal head 38 with a medium 2 can be maintained to be substantially constant. In other words, in this embodiment, a contact pressure of the thermal head 38 with a medium 2 can be prevented from becoming larger than a predetermined value.

In this embodiment, when viewed in the right and left direction, the shaft member 83, the thermal head 36 and the support shaft 72 are disposed in this order from an upper side and a distance between the shaft member 83 and the support shaft 72 is set to be longer than a distance between the medium contact face 74a and the support shaft 72. In other words, in this embodiment, a distance between the shaft member 83 as a force point and the support shaft 72 as a supporting point when the thermal head 36 is turned is set to be longer than a distance between the medium contact face 74a as an operation point and the support shaft 72 as the supporting point. Therefore, in this embodiment, even when power of the solenoid 82 is small, the medium contact face 74a can be contacted with a medium 2 with a predetermined contact pressure.

Similarly, in this embodiment, when viewed in the right and left direction, the shaft member 113, the thermal head 38 and the support shaft 102 are disposed in this order from an upper side and a distance between the shaft member 113 as a force point and the support shaft 102 as a supporting point when the thermal head 38 is turned is set to be longer than a distance between the medium contact face 104a as an operation point and the support shaft 102 as the supporting point. Therefore, in this embodiment, even when power of the solenoid 112 is small, the medium contact face 104a can be contacted with a medium 2 with a predetermined contact pressure.

In this embodiment, when viewed in the right and left direction, the support shaft 72 is disposed on a slightly front side in the front and rear direction with respect to the medium contact face 74a contacting with a medium 2 from the front side. Therefore, in this embodiment, a contact pressure of the medium contact face 74a with the medium 2 can be increased effectively. Similarly, in this embodiment, when viewed in the right and left direction, the support shaft 102 is disposed on a slightly rear side in the front and rear direction with respect to the medium contact face 104a contacting with a medium 2 from the rear side and thus, a contact pressure of the medium contact face 104a with the medium 2 can be increased effectively.

Other Embodiments

Although the present invention has been shown and described with reference to a specific embodiment, various changes and modifications will be apparent to those skilled in the art from the teachings herein.

Figure 20:
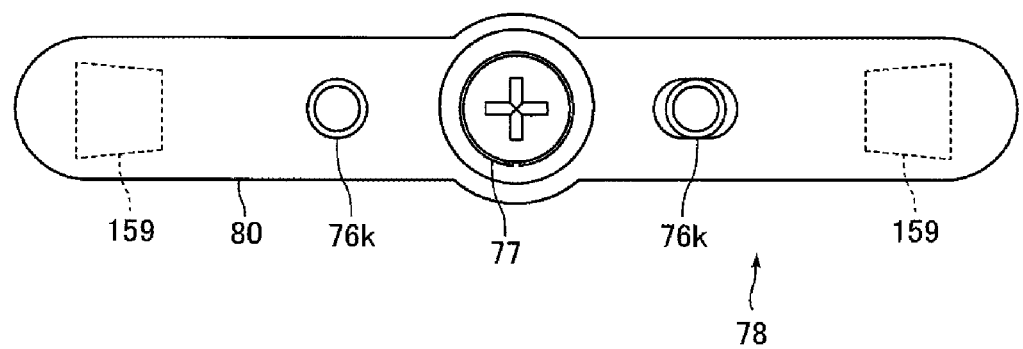
FIG. 20 is a view for explaining a pressing mechanism in accordance with another embodiment of the present invention.

In the embodiment described above, the pressing mechanism 78 includes the spherical member 79 as a rotational member which is contacted with the thermal head 36 and is capable of turning. However, the pressing mechanism 78 may include a rotational member other than the spherical member 79. For example, as shown in FIG. 20, the pressing mechanism 78 may include, instead of the spherical member 79, a rotational member 159 in a truncated cone shape which contacts with the thermal head 36 and turns so that the thermal head 36 can be relatively turned with respect to the head holding member 76 with the support shaft 77 as a turning center. Similarly, the pressing mechanism 108 may include the rotational member 159 instead of the spherical member 109.

In the embodiment described above, two spherical members 79 are respectively disposed at substantially equal distances from the support shaft 77 in the right and left direction. However, the present invention is not limited to this embodiment. For example, two spherical members 79 may be disposed at different distances from the support shaft 77 in the right and left direction. Similarly, in the embodiment described above, two spherical members 109 are respectively disposed at substantially equal distances from the support shaft 107 in the right and left direction. However, two spherical members 109 may be disposed at different distances from the support shaft 107 in the right and left direction.

In the embodiment described above, one spherical member 79 is disposed on each of both sides with respect to the support shaft 77 in the right and left direction. However, the present invention is not limited to this embodiment. For example, two or more spherical members 79 may be disposed on each of both sides with respect to the support shaft 77. Similarly, in the embodiment described above, one spherical member 109 is disposed on each of both sides with respect to the support shaft 107 in the right and left direction. However, two or more spherical members 109 may be disposed on each of both sides with respect to the support shaft 107.

In the embodiment described above, the spherical member 79 is urged toward the thermal head 36 by the plate spring 80. However, the present invention is not limited to this embodiment. For example, the spherical member 79 may be urged toward the thermal head 36 by another spring member such as a compression coil spring or may be urged toward the thermal head 36 by an elastic member such as rubber. Alternatively, the spherical member 79 may be urged toward the thermal head 36 by a resin spring which is integrally formed with the head holding member 76.

Similarly, in the embodiment described above, the spherical member 109 is urged toward the thermal head 38 by the plate spring 110. However, the spherical member 109 may be urged toward the thermal head 38 by another spring member such as a compression coil spring or may be urged toward the thermal head 38 by an elastic member such as rubber. Alternatively, the spherical member 109 may be urged toward the thermal head 38 by a resin spring which is integrally formed with the head holding member 106.

In the embodiment described above, the tension coil spring 91 is disposed between the head holding member 76 and the plunger 82a. However, the present invention is not limited to this embodiment. For example, another spring member such as a plate spring or an elastic member such as rubber may be disposed between the head holding member 76 and the plunger 82a. Similarly, in the embodiment described above, the tension coil spring 121 is disposed between the head holding member 106 and the plunger 112a. However, another spring member such as a plate spring or an elastic member such as rubber may be disposed between the head holding member 106 and the plunger 112a.

In the embodiment described above, the tension coil spring 91 is disposed between the head holding member 76 and the plunger 82a. However, the present invention is not limited to this embodiment. For example, it may be structured that an attaching position of the solenoid 82 is adjusted so that, when the plunger 82a is completely retracted, the thermal head 36 is contacted with a medium 2 and a contact pressure of the thermal head 36 with the medium 2 is set to be a predetermined constant pressure. According to this structure, an elastic member such as the tension coil spring 91 is not required to be disposed between the head holding member 76 and the plunger 82a. In this case, the insertion hole 85b of the link plate 85 is formed in a circular shape whose inner diameter is substantially equal to the outer diameter of the shaft member 84.

Similarly, in the embodiment described above, the tension coil spring 121 is disposed between the head holding member 106 and the plunger 112*a*. However, it may be structured that an attaching position of the solenoid 112 is adjusted so that, when the plunger 112*a* is completely retracted, the thermal head 38 is contacted with a medium 2 and a contact pressure of the thermal head 38 with the medium 2 is set to be a predetermined constant pressure. According to this structure, an elastic member such as the tension coil spring 121 is not required to be disposed between the head holding member 106 and the plunger 112*a*. In this case, a width of the insertion hole 106*c* in the upper and lower direction is set to be substantially equal to the outer diameter of shaft member 113.

In the embodiment described above, when viewed in the right and left direction, the shaft member 83, the thermal head 36 and the support shaft 72 are disposed in this order from an upper side. However, the present invention is not limited to this embodiment. For example, when viewed in the right and left direction, the shaft member 83, the support shaft 72 and the thermal head 36 may be disposed in this order from an upper side. Similarly, in the embodiment described above, when viewed in the right and left direction, the shaft member 113, the thermal head 38 and the support shaft 102 are disposed in this order from an upper side. However, when viewed in the right and left direction, the shaft member 113, the support shaft 102 and the thermal head 38 may be disposed in this order from an upper side.

In the embodiment described above, the screw hole 74*c* is formed on the under face of the head main body 74 and a portion of the screw hole 74*c* where the tapered face 74*d* is formed is the tapered hole in a substantially truncated cone shape where a part of the spherical member 79 is disposed. However, the present invention is not limited to this embodiment. For example, a tapered hole formed of only a tapered face similar to the tapered face 74*d* may be formed on the under face of the head main body 74 without forming the screw hole 74*c*. Similarly, a tapered hole formed of only a tapered face similar to the tapered face 74*d* may be formed on the under face of the head main body 104 without forming a screw hole corresponding to the screw hole 74*c*.

In the embodiment described above, the first moving mechanism 71 includes the solenoid 82 as a drive source, but the first moving mechanism 71 may include, instead of the solenoid 82, a motor and a power transmission mechanism such as a cam which is connected with the motor. Similarly, in the embodiment described above, the second moving mechanism 101 includes the solenoid 112 as a drive source, but the second moving mechanism 101 may include, instead of the solenoid 112, a motor and a power transmission mechanism such as a cam which is connected with the motor.

In the embodiment described above, the print processing part 4 includes the first head part 37 and the second head part 39, but the print processing part 4 may include only one of the first head part 37 and the second head part 39. Further, the medium processing apparatus 1 includes the magnetic data processing part 3, but the medium processing apparatus 1 may include no magnetic data processing part 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A medium processing apparatus for use with a medium in a card shape, the medium processing apparatus comprising:
    a medium conveying passage where the medium is conveyed;
    a thermal head which is structured to contact with the medium passing the medium conveying passage and perform printing;
    a head holding part structured to hold the thermal head; and
    a moving mechanism structured to move the thermal head and the head holding part between a contact position where the thermal head contacts the medium and a retreated position where the thermal head is retreated from the medium conveying passage;
    wherein the head holding part comprises:
        a head holding member;
        a head support shaft structured to support the thermal head so that the thermal head turns with respect to the head holding member with a conveyance direction of the medium when the thermal head and the head holding part are located at the contact position as an axial direction of turning; and
        a pressing mechanism structured to press the thermal head toward the head holding member in the conveyance direction of the medium when the thermal head and the head holding part are located at the contact position;
    wherein the pressing mechanism comprises a rotational member, which is contacted with the thermal head and is turnable, and an urging member structured to urge the rotational member toward the thermal head.

2. The medium processing apparatus according to claim 1, wherein
    the rotational member is a spherical member formed in a spherical shape, and
    the urging member is a plate spring which is fixed to the head holding member at an attaching position of the head support shaft.

3. The medium processing apparatus according to claim 2, wherein the thermal head is formed with a tapered hole in a substantially truncated cone shape where a part of the spherical member is disposed.

4. The medium processing apparatus according to claim 1, wherein the rotational member is disposed on both sides with respect to the head support shaft in a widthwise direction of the medium which is substantially perpendicular to a thickness direction of the medium passing the medium conveying passage and the conveyance direction of the medium.

5. The medium processing apparatus according to claim 4, wherein the rotational members which are disposed on both sides with respect to the head support shaft are disposed at substantially equal distances from the head support shaft in the widthwise direction of the medium.

6. A medium processing apparatus for use with a medium in a card shape, the medium processing apparatus comprising:
    a medium conveying passage where the medium is conveyed;
    a thermal head which is structured to contact with the medium passing the medium conveying passage and perform printing;
    a head holding part structured to hold the thermal head;
    a moving mechanism structured to move the thermal head and the head holding part between a contact position where the thermal head contacts the medium and a retreated position where the thermal head is retreated from the medium conveying passage; and a holding part support shaft which is disposed with a widthwise direction of the medium substantially perpendicular to a thickness direction of the medium passing the medium conveying passage and the conveyance direction of the medium as an axial direction, the holding part support shaft supporting the head holding part, wherein the head holding part comprises:
a head holding member;
a head support shaft structured to support the thermal head so that the thermal head turns with respect to the head holding member with a conveyance direction of the medium when the thermal head and the head holding part are located at the contact position as an axial direction of turning; and
a pressing mechanism structured to press the thermal head toward the head holding member in the conveyance direction of the medium when the thermal head and the head holding part are located at the contact position;
wherein the moving mechanism comprises a solenoid,
wherein the thermal head and the head holding part are turned with the holding part support shaft as a turning center by an operation of a plunger of the solenoid and are moved between the contact position and the retreated position, and
wherein an elastic member for preventing a contact pressure of the thermal head with the medium from becoming larger than a predetermined value is disposed between the head holding member and the plunger.

7. The medium processing apparatus according to claim 6, wherein
the moving mechanism comprises:
a first shaft member which is fixed to the plunger with the widthwise direction of the medium as an axial direction;
a link plate which is formed with a first insertion hole into which the first shaft member is inserted, the first insertion hole being formed on a base end side of the link plate; and
a second shaft member which is inserted into a second insertion hole formed on a tip end side of the link plate with the widthwise direction of the medium as an axial direction, the second shaft member being engaged with the head holding member,
each of the first shaft member and the second shaft member is engaged with each of both ends of a tension coil spring as the elastic member,
an inner diameter of the first insertion hole is substantially equal to an outer diameter of the first shaft member, and
a width of the second insertion hole in a moving direction of the plunger is set to be wider than an outer diameter of the second shaft member so that the link plate is relatively movable with respect to the second shaft member in the moving direction of the plunger.

8. The medium processing apparatus according to claim 6, wherein
the moving mechanism comprises a first shaft member which is fixed to the plunger with the widthwise direction of the medium as an axial direction,
the head holding member is formed with an insertion hole into which the first shaft member is inserted,
each of the first shaft member and the head holding member is engaged with each of both ends of a tension coil spring as the elastic member, and a width of the insertion hole in a moving direction of the plunger is set to be wider than an outer diameter of the first shaft member so that the first shaft member is relatively movable with respect to the head holding member in the moving direction of the plunger.

9. A medium processing apparatus for use with a medium in a card shape, the medium processing apparatus comprising:
a medium conveying passage where the medium is conveyed;
a thermal head which is structured to contact with the medium passing the medium conveying passage and perform printing;
a head holding part structured to hold the thermal head;
a moving mechanism structured to move the thermal head and the head holding part between a contact position where the thermal head contacts the medium and a retreated position where the thermal head is retreated from the medium conveying passage; and
a holding part support shaft structured to support the head holding part, the holding part support shaft being disposed with a widthwise direction of the medium substantially perpendicular to a thickness direction of the medium passing the medium conveying passage and the conveyance direction of the medium as an axial direction,
wherein the head holding part comprises:
a head holding member;
a head support shaft structured to support the thermal head so that the thermal head turns with respect to the head holding member with a conveyance direction of the medium when the thermal head and the head holding part are located at the contact position as an axial direction of turning; and
a pressing mechanism structured to press the thermal head toward the head holding member in the conveyance direction of the medium when the thermal head and the head holding part are located at the contact position;
wherein the moving mechanism comprises a solenoid and a first shaft member which is fixed to a plunger of the solenoid with the widthwise direction of the medium as an axial direction,
wherein the thermal head is provided with a medium contact face for contacting with the medium,
wherein the thermal head and the head holding part are turned by an operation of the plunger with the holding part support shaft as a turning center to be moved between the contact position and the retreated position,
wherein the first shaft member, the thermal head and the holding part support shaft are arranged in this order in the conveyance direction of the medium when viewed in the widthwise direction of the medium, and
wherein the holding part support shaft is disposed at a position which is nearer to the medium contact face than the first shaft member in the thickness direction of the medium.

10. The medium processing apparatus according to claim 6, wherein the pressing mechanism comprises a rotational member, which is contacted with the thermal head and is turnable, and an urging member structured to urge the rotational member toward the thermal head.

11. The medium processing apparatus according to claim 10, wherein
the rotational member is a spherical member formed in a spherical shape, and
the urging member is a plate spring which is fixed to the head holding member at an attaching position of the head support shaft.

12. The medium processing apparatus according to claim 10, wherein the rotational member is disposed on both sides with respect to the head support shaft in a widthwise direction of the medium which is substantially perpendicular to a thickness direction of the medium passing the medium conveying passage and the conveyance direction of the medium.

13. The medium processing apparatus according to claim 10, wherein the pressing mechanism comprises a rotational member, which is contacted with the thermal head and is turnable, and an urging member structured to urge the rotational member toward the thermal head.

14. The medium processing apparatus according to claim 13, wherein
the rotational member is a spherical member formed in a spherical shape, and
the urging member is a plate spring which is fixed to the head holding member at an attaching position of the head support shaft.

15. The medium processing apparatus according to claim 13, wherein the rotational member is disposed on both sides with respect to the head support shaft in a widthwise direction of the medium which is substantially perpendicular to a thickness direction of the medium passing the medium conveying passage and the conveyance direction of the medium.

* * * * *